United States Patent
Nguyen

(10) Patent No.: US 8,027,273 B2
(45) Date of Patent: Sep. 27, 2011

(54) SYSTEM AND METHOD FOR VISUALLY CREATING, EDITING, MANIPULATING, VERIFYING, AND/OR ANIMATING DESIRED TOPOLOGIES OF A MOBILE AD HOC NETWORK AND/OR FOR GENERATING MOBILITY-PATTERN DATA

(75) Inventor: Binh Quang Nguyen, Bethesda, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 143 days.

(21) Appl. No.: 12/237,095

(22) Filed: Sep. 24, 2008

(65) Prior Publication Data

US 2010/0074141 A1    Mar. 25, 2010

(51) Int. Cl.
*H04L 12/28* (2006.01)
(52) U.S. Cl. .................... 370/254; 370/238; 370/255
(58) Field of Classification Search .................. 370/235, 370/238, 254, 455, 351, 255; 709/223, 224
See application file for complete search history.

(56) References Cited

U.S. PATENT DOCUMENTS

| | | | |
|---|---|---|---|
| 5,253,248 A * | 10/1993 | Dravida et al. ................ 370/228 |
| 5,412,654 A | 5/1995 | Perkins |
| 5,649,165 A | 7/1997 | Jain et al. |
| 5,666,366 A | 9/1997 | Malek et al. |
| 5,822,309 A | 10/1998 | Avanoglu et al. |
| 6,232,848 B1 | 5/2001 | Manku |
| 6,304,556 B1 | 10/2001 | Haas |
| 6,411,923 B1 | 6/2002 | Stewart et al. |
| 6,678,252 B1 | 1/2004 | Cansever |
| 6,845,091 B2 | 1/2005 | Ogier et al. |
| 6,912,207 B2 | 6/2005 | Ohnishi et al. |
| 6,970,714 B2 | 11/2005 | D'Souza et al. |
| 7,046,639 B2 | 5/2006 | Garcia-Luna-Aceves et al. |
| 2002/0012320 A1 | 1/2002 | Ogier et al. |
| 2002/0062388 A1 | 5/2002 | Ogier et al. |
| 2002/0067736 A1 | 6/2002 | Garcia-Luna-Aceves et al. |
| 2003/0145110 A1 | 7/2003 | Ohnishi et al. |
| 2003/0163554 A1 | 8/2003 | Sendrowicz |
| 2003/0179742 A1 | 9/2003 | Ogier et al. |
| 2003/0203742 A1 | 10/2003 | D'Souza et al. |
| 2004/0081152 A1 | 4/2004 | Thubert et al. |

(Continued)

OTHER PUBLICATIONS

An Automated Tool for the Creation of Desired Emulated Topologies of a Mobile Ad-Hoc Network by Binh Q. Nguyen ARL-TR-3721 Jan. 2006.*

(Continued)

*Primary Examiner* — Chi Pham
*Assistant Examiner* — Weibin Huang
(74) *Attorney, Agent, or Firm* — Avrom David Spevack; Lawrence E. Anderson

(57) ABSTRACT

A method and apparatus for creating virtual topologies for a mobile ad hoc network comprising generating at least two nodes representing transmitters and/or receivers in the network; each of said at least two nodes having parameters (which may be for example, location, direction, velocity, receiving/transmitting capability); generating a bidirectional or unidirectional link between two nodes when appropriate; storing the specifications of the topology of the network in memory; whereby the stored topologies are adapted to be inputted into a test-bed system capable of emulating a mobile ad-hoc network. Optionally, the images of the nodes and links are displayed on a display and/or may be stored on a programmable storage medium.

16 Claims, 28 Drawing Sheets

U.S. PATENT DOCUMENTS

| | | |
|---|---|---|
| 2004/0083277 A1 | 4/2004 | Chaporkar et al. |
| 2004/0162741 A1 | 8/2004 | Flaxer et al. |
| 2004/0168138 A1 | 8/2004 | Neal et al. |
| 2004/0218548 A1 | 11/2004 | Kennedy et al. |
| 2005/0041627 A1 | 2/2005 | Duggi |
| 2005/0114493 A1 | 5/2005 | Mandato et al. |
| 2005/0192037 A1 | 9/2005 | Nanda et al. |
| 2005/0265259 A1 | 12/2005 | Thubert et al. |
| 2005/0276231 A1 | 12/2005 | Ayyagarti et al. |
| 2005/0282494 A1 | 12/2005 | Kossi et al. |
| 2006/0029007 A1 | 2/2006 | Ayyagari |
| 2006/0031429 A1 | 2/2006 | Ayyagari |
| 2006/0031477 A1 | 2/2006 | Ayyagari |
| 2006/0159024 A1 | 7/2006 | Hester |

OTHER PUBLICATIONS

PyGFC . A Python Extension to the C++ Geodesy Foundation Classes by Binh Nguyen Draft. Aug. 14, 2008 10:06:00 AM.*

Camp, T. et al., "A Survey of Mobility Models for Ad Hoc Network Research," Research, Trends and Applications, Vol. 2, No. 5, Sep. 10, 2002, pp. 483-502.

Zheng, Q., et al., "Recent Advances in Mobility Modeling for Mobile Ad Hoc Network Research," ACMSE '04, ACM 1-58113-870-9/04/04, Apr. 2-3, 2004, pp. 1-6.

Kurkowski, S., et al., "MANET Simulation Studies: The Incredibles," Mobile Computing and Communications Review, Col. 9, No. 4, pp. 50-61.

Macker, J., et al., "A Low-Cost, IP-Based Mobile Network Emulator (MNE)," Proc. of MILCOM 2003, Naval Research Laboratory, Washington, DC, Oct. 13-16, 2003, pp. 481-486.

Networks and Communication Systems Branch, "Mobile Ad-hoc Network Emulator (MANE)," http://cs.itd.nrl.navy..mil/work/mane/index/php, pp. 1-2.

Science Application International Corporation, "Comtest Scenario Generator User's Manual and Technical Reference," Oct. 1, 2003, pp. 1-93.

Little, M., "TEALab : A Testbed for Ad hoc Networking Security Research, " Telcordia Technologies, Proc. of MILCOM 2005, Atlantic City, NJ, Oct. 17, 2005, pp. 1-7.

Ray, S., "Realistic Mobility for MANET Simulation," The University of British Columbia, Dec. 2003, pp. 1-54.

Shah, S., et al., "CAD-HOC : A CAD-Like Tool for Generating Mobility Benchmarks in Ad-Hoc Networks," Proc. of the 2002 Symp. on Applns. and the Internet (SAINT'02), pp. 1-10.

Günes, M., et al., "CosMos—Communication Scenario and Mobility Scenario Generator for Mobile Ad-hoc Networks," Intern. Computer Science Institute, Aug. 20, 2005, pp. 1-17.

Maeda, K., et al., "MobiREAL: Scenario Generation and Toolset for MANET Simulation with Realistic Node Mobility," pp. 1-4.

Karygiannis, A., et al., "mLab: A Mobile Ad Hoc Network Test Bed," 1st Workshop on Security, Privacy and Trust in Pervasive and Ubiquitous Computing, Jul. 14, 2005, pp. 1-6.

Chao, W., et al., NRL Mobile Network Emulator, Naval Research Laboratory, NRL/FR/5523—03-10,054, Jan. 24, 2003, pp. 1-15.

Zheng, P., et al., "ENWIN: Emulating a Mobile Wireless Network using a Wired Network," WOWMON'02, ACM 1-58113-474-06-02,0009, Sep. 28, 2002, pp. 64-71.

Mahadevan, P., et al., "MobiNet: A Scalable Emulation Infrastructure for Ad Hoc and Wireless Networks," USENIX Association, WirMeMo '05, pp. 7-12.

Nguyen, B., "An Automated Tool for the Creation of Desired Emulated Topologies of a Mobile Ad Hoc Network," ARL-TR-3721, Army Research Laboratory, Jan. 2006.

Nguyen, B., "A Tool for Visualizing Mobile Ad Hoc Network Topology Definition Files," ARL-TR-3750, Army Research Laboratory, Feb. 2006.

Corson, S., et al., "Mobile Ad-hoc Networking: Routing Protocol Performance Issues and Evaluation Considerations," IETF RFC 2501, Jan. 1999.

Gallager, R., "Lecture 20:Wireless Communications Systems," MIT Course # 6.450 Principles of Digital Communications I, Fall 2002, MIT OpenCourseWare, Nov. 25, 2002.

The Carnegie Mellon University Monarch Project's Wireless and Mobililty Extensions to ns, Computer Science Dept., Carnegie Mellon Univertity, Pittsburgh, PA Aug. 5, 1999.

Rappaport, T., "Wireless Communications: Principles and Practice," 2nd Ed., Prentice Hall, Inc., Upper Saddle River, NJ, 2002, pp. 105-109.

Hogg, D.C., "Fun with the Friis Free-Space Transmission Formula," Antennas and Propagation Magazine, IEEE vol. 35, Issue 4, Aug. 1993, pp. 33-35.

Lin, T., et al., "A Dynamic Topology Switch for the Emulation of Wireless Ad Hoc Networks Using a Wired Network," (LCN'02), pp. 791-798, Nov. 2002.

Zhang, Y, et al., "An Integrated Environment for Testing Mobile Ad-Hoc Networks," Proc. 3rd ACM Intern. Sym. on Mobile Ad Hoc Networking and Computing (MobiHoc'02), Jun. 2002.

Matthes, M., et al., "An Emulation Environment for Mobile Ad-hoc Networks," Proc. 2nd Conf. on Wireless On-demand Network Systems and Services (WONS'05), Jan. 2005.

The U.S. Naval Research Laboratory, "Nettion (Network Testing and Operational Environment)," URL: http://nettion.pf.itd.nrl.navy.mil/nettion_index.html (Sep. 10, 2005).

The Python Software Foundation, "What is Python?" URL: http:www.python.org (Sep. 11, 2005).

"Workgroup Mobile Ad-hoc Networks, Mobility Visualizer, Lehrstuhl für Informatik," URL: http://www-i4.informatik.rwth-aachen.de/~mesut/manet/tools/MobilityVisualizer.jar.

Tønnesen, A., "Dot Topology Information Plugin," URL: http://www.olsr.org.

Nguyen, B., "The ARL TOPODEF Tool for Designing Mobile Ad-Hoc Network Toplogies to Support Emulation," IEEE 2007.

* cited by examiner

| Random Walk | ✕ |
|---|---|

| | |
|---|---|
| direction angle – maximum (degrees) | 360.0 |
| direction angle – minimum (degrees) | 0.0 |
| initial MANET size (number of nodes) | 50 |
| number of topologies | 300 |
| scenario run time (seconds) | 300 |
| speed – maximum (meters/second) | 16.6666666667 |
| speed – minimum (meters/second) | 0.0 |
| ☐ constantly changing velocity | |

[ OK ]  [ Cancel ]

| User-Defined Path | ✕ |
|---|---|

| | |
|---|---|
| initial MANET size (number of nodes) | 10 |
| scenario run time (seconds) | 1200 |
| speed – (meters/sec) | 16.67 |
| time duration between updates (secs) | 1 |

[ OK ]  [ Cancel ]

CT-4

Free Space Loss Model Parameters

| | |
|---|---|
| K constant | 32.44 |
| error-free radium (meters) | 10 |
| frequency (Hz) | 2400000000.0 |
| gain – rx (dBm) | 1.0 |
| gain – tx (dBm) | 1.0 |
| power – rx (dBm) | -68.0 |
| power – tx (dBm) | 14.0 |

CT-9

OK    Cancel

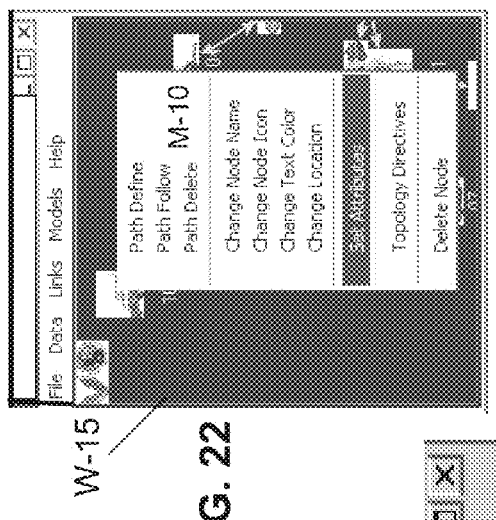
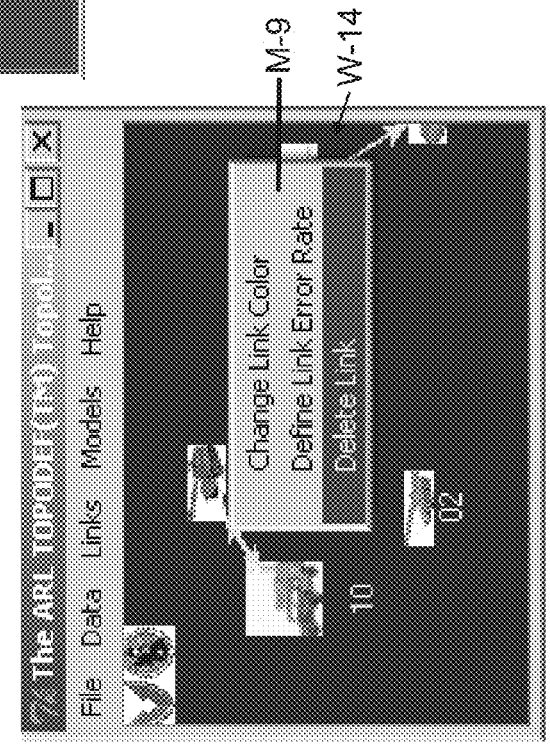
FIG. 23
FIG. 22
FIG. 21

Event 1: The left button of the mouse is released
Event 2: The dragging of the mouse
Event 3: The right button of the mouse is pressed

FIG. 29

| Node Attributes | |
|---|---|
| Address – IP | 192.168.1.25 |
| Address – MAC | 00:11:22:33:02:25 |
| K constant | 32.44 |
| direction 0.2*pi | 4.83423524038 |
| error-free radius (meters) | 10 |
| frequency (Hz) | 2400000000.0 |
| gain – rx (dBm) | 0.0 |
| gain – tx (dBm) | 0.0 |
| power – rx (dBm) | -81.0 |
| power – tx (dBm) | 25.0 |
| speed (meters/sec) | 16.67 |

OK   Cancel

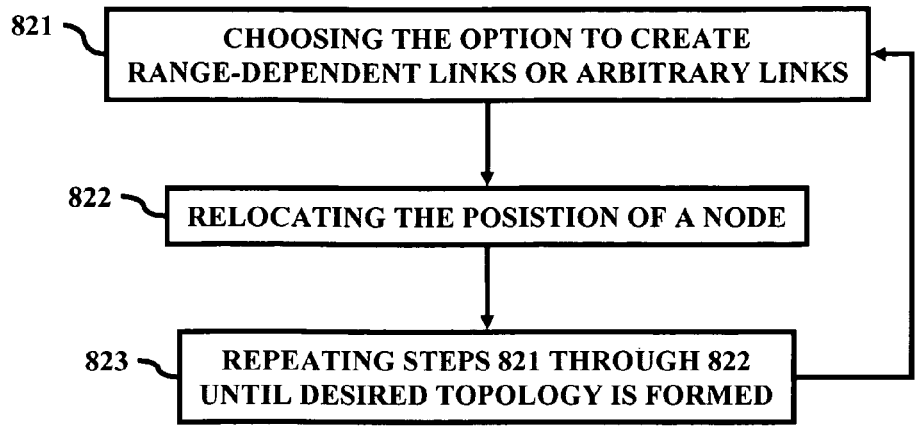
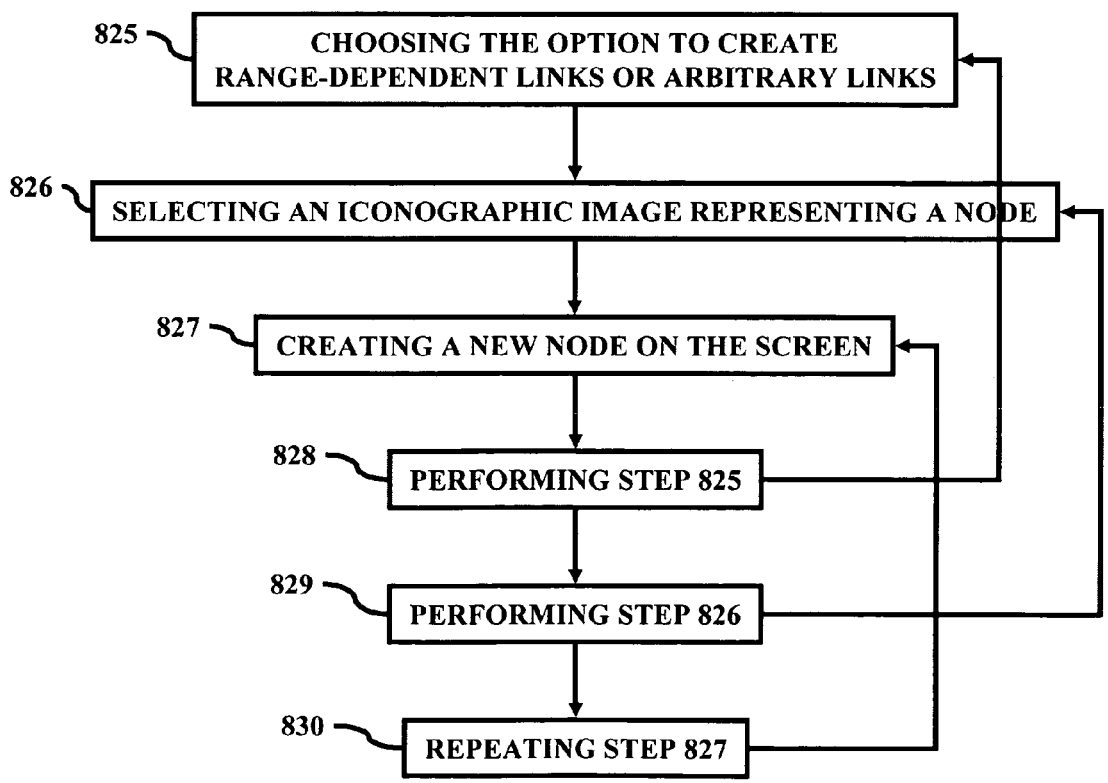

FIG. 33(I)

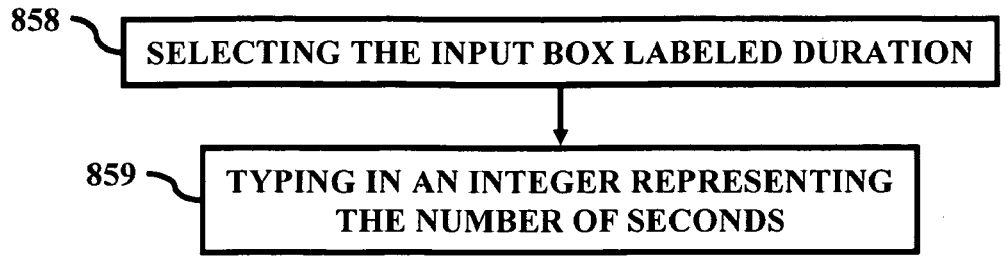

- 858 — SELECTING THE INPUT BOX LABELED DURATION
- 859 — TYPING IN AN INTEGER REPRESENTING THE NUMBER OF SECONDS

FIG. 33(J)

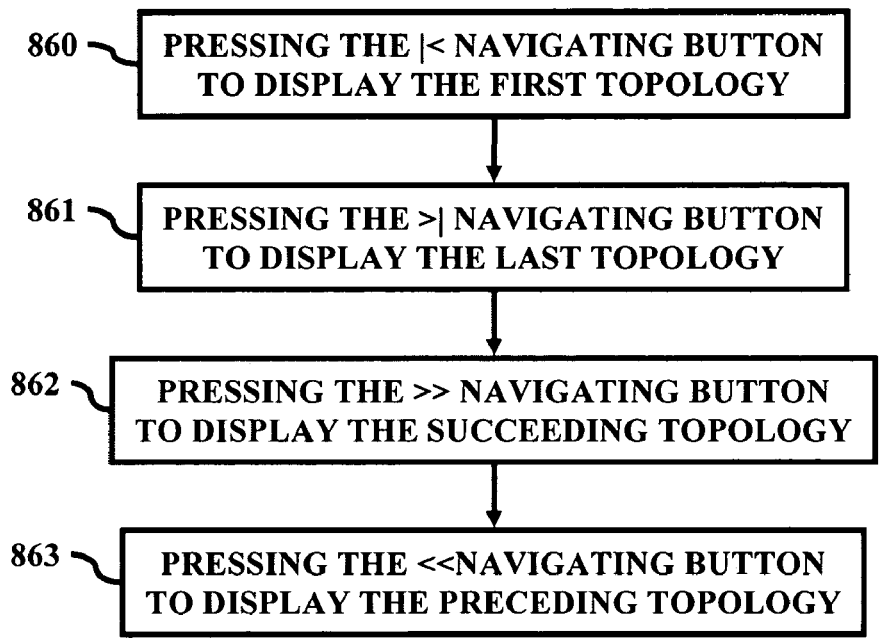

- 860 — PRESSING THE |< NAVIGATING BUTTON TO DISPLAY THE FIRST TOPOLOGY
- 861 — PRESSING THE >| NAVIGATING BUTTON TO DISPLAY THE LAST TOPOLOGY
- 862 — PRESSING THE >> NAVIGATING BUTTON TO DISPLAY THE SUCCEEDING TOPOLOGY
- 863 — PRESSING THE <<NAVIGATING BUTTON TO DISPLAY THE PRECEDING TOPOLOGY

FIG. 33(K)

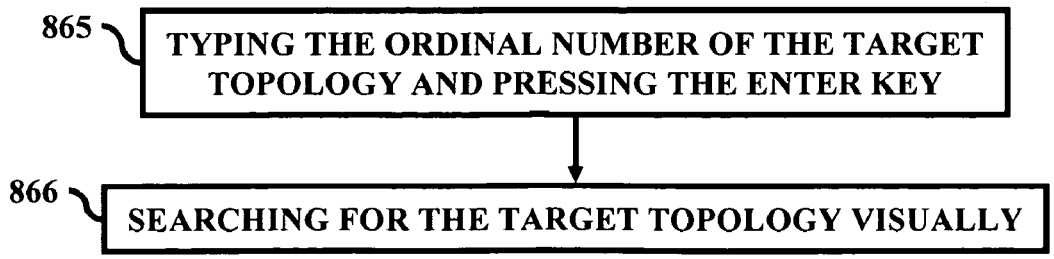

- 865 — TYPING THE ORDINAL NUMBER OF THE TARGET TOPOLOGY AND PRESSING THE ENTER KEY
- 866 — SEARCHING FOR THE TARGET TOPOLOGY VISUALLY

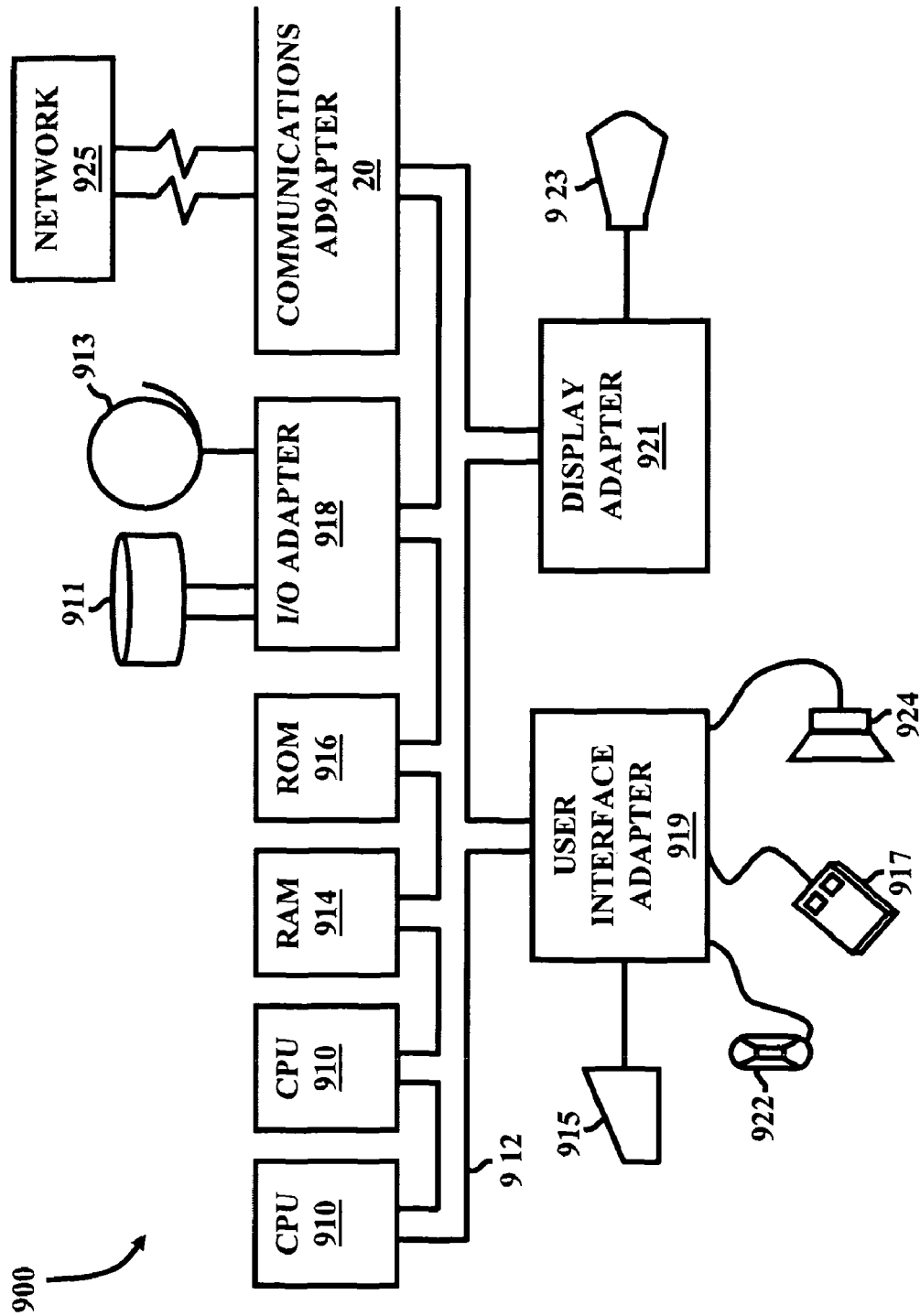

SYSTEM AND METHOD FOR VISUALLY CREATING, EDITING, MANIPULATING, VERIFYING, AND/OR ANIMATING DESIRED TOPOLOGIES OF A MOBILE AD HOC NETWORK AND/OR FOR GENERATING MOBILITY-PATTERN DATA

GOVERNMENT INTEREST

The embodiments described herein may be manufactured, used, and/or licensed by or for the United States Government without the payment of royalties hereon.

BACKGROUND

1. Technical Field

The present invention relates to networked communications such as ad-hoc networks, and, more particularly to mobile ad-hoc networks (MANET).

2. Description of the Related Art

There are three different ways to conduct a MANET experiment: (1) actual field exercises, (2) simulation, and (3) emulation. An actual field exercise is the most expensive one in terms of time, effort, resources, and human power. Simulation provides a controllable, repeatable virtual environment in which theoretical concepts are implemented and evaluated. Emulation is between the two; it also provides a controllable and repeatable environment in which one can conduct and repeat experimentation in a physical test bed—not in a virtual environment as simulation does.

The invention is intended mainly to support emulation although its outputs can also be used to feed a simulation tool; e.g., the time-stamped positions or also known as mobility traces or traces or a mobility scenario or simply just scenario. Both simulation and emulation requires a scenario, which is a mobility scenario for the mobile ad-hoc network emulator (MANE) test bed or a set of topology definitions for an emulation test bed that uses a packet-filtering tool to create virtual topologies in a physical network such as the TEALab test bed. The invention is intended mainly to support the MANE and the TEALab test beds. The functionality of the two test beds are described in subsequent sections.

The present invention relates to providing high quality information assurance in a networking environment. Military tactical communications require network security precautions that are distinct from the commercial world. However, the underlying characteristic is the fluid nature of the environment, since network participants are mobile. Group make-up varies over time, since units join and leave on an ad hoc basis. Thus, communication links vary both quality and reach. Unit responsibilities also shift as mission requirements and battlefield circumstances dictate. There may be no fixed infrastructure that can be relied upon. In addition, equipment may be captured by adversaries who are highly motivated, extremely skilled, and well funded. Security in such an environment is vital to the network warfare operation.

The present invention relates to the emulation and simulation of wireless, mobile networks. As used herein, a network topology is a pattern of links connecting pairs of nodes of a network. A node is a device that is connected as part of a computer network, and a data link is the means of connecting. It can be appreciated that in the course of movement of wireless operators, the ability of the operators to communicate with one another is of paramount importance. Rather than carry out the network capability measurements during actual real world experimental work to determine the communication links created or destroyed as the operators move in predetermined areas, simulation programs and emulation test beds are used to predict the networking capabilities.

A more complete description of the characteristics of Mobile Ad Hoc Networks is found in RFC# 2501 (http://www.ietf.org/rfc/rfc2501.txt) entitled "Mobile Ad hoc Networking (MANET): Routing Protocol Performance Issues and Evaluation Considerations," by S. Corson of University of Maryland and J. Macker of Naval Research Laboratory, January 1999. As stated therein, a MANET consists of mobile platforms (e.g., a router with multiple hosts and wireless communications devices)—herein simply referred to as "nodes"—which are free to move about arbitrarily. The nodes may be located in or on airplanes, ships, trucks, cars, perhaps even on people or very small devices, and there may be multiple hosts per router. A MANET is an autonomous system of mobile nodes. The system may operate in isolation, or may have gateways to and interface with a fixed network. In the latter operational mode, it is typically envisioned to operate as a "stub" network connecting to a fixed internetwork. Stub networks carry traffic originating at and/or destined for internal nodes, but do not permit exogenous traffic to "transit" through the stub network. MANET nodes are equipped with wireless transmitters and receivers using antennas which may be omnidirectional (broadcast), highly-directional (point-to-point), possibly steerable, or some combination thereof. At a given point in time, depending on the nodes' positions and their transmitter and receiver coverage patterns, transmission power levels and co-channel interference levels, a wireless connectivity in the form of a random, multihop graph or "ad hoc" network exists between the nodes. This ad hoc topology may change with time as the nodes move or adjust their transmission and reception parameters.

The characteristics of MANETs include (1) Dynamic topologies due to arbitrary movement of nodes which arbitrarily changes network topology, which may consist of both bidirectional and unidirectional links, (2) Bandwidth-constrained, variable capacity links and the realized throughput of wireless communications when taking into consideration the effects of multiple access, fading, noise, interference conditions, etc. is often much less than a radio's maximum transmission rate; (3) Energy-constrained operation due to reliance at least in part on batteries or the like, requiring optimal energy conservation; (4) Limited physical security due to the increased possibility of eavesdropping, spoofing, and denial-of-service attack such that decentralized nature of network control in MANETs provides additional robustness against the single points of failure of more centralized approaches. In addition, MANETS may be tens or hundreds of nodes per routing area.

Simulation is a leading way to research solutions to difficult Mobile Ad Hoc Networks (MANETs), which are wireless mobile nodes that cooperatively form a network without reliance on an existing infrastructure. There is no coordination or configuration prior to setup of a MANET. Routing packets are used in an environment where the topology is changing frequently creating wireless communications issues, and resource issues such as limited power and storage.

There are several factors involved in conducting trustworthy simulation-based research. Generally, there are four areas of credibility in research. 1. Repeatable: A fellow researcher should be able to repeat the results for his/her own satisfaction, future reviews, or further development. 2. Unbiased: The results must not be specific to the scenario used in the experiment. 3. Rigorous: The scenarios and conditions used to test the experiment must truly exercise the aspect of MANETs being studied. 4. Statistically sound: The execution and analysis of the experiment must be based on mathematical principles.

Executing the simulation can require a lot of time and effort. Therefore, it is important to conduct the execution portion correctly and expediently. In a publication entitled "MANET Simulation Studies: The Incredibles," several common simulation pitfalls were enumerated. Simulation setup involves determining (a) type: terminating or steady-state), (b) model validation & verification, (c) PRNG Validation & Verification (PNRG is a package for maintaining and visualizing network data, particularly historical trend analysis of network resources), (d) variable definitions (hundreds of configurable variables may be used during an execution in order to meet general wired and wireless network simulator requirements), and (e) scenario development (using the correct parameters, including the number of nodes, the size of the simulation area, and the transmission range of nodes used in the simulations). Simulation execution involves: (a) setting the PRNG seed, (b) scenario initialization, and (c) metric collection. Output analysis requires (a) analysis of proper size of data sets, (b) statistical analysis and (c) confidence intervals.

The present invention is directed to a methodology of custom-designing network topology and creating time-stamped position data to drive, inter alia, the Mobile Ad-hoc Network Emulator (MANE) system consisting of hardware and software. Downloadable examples of the MANE software are presented at http://downloads.pf.itd.nrl.navy.mil/mane/, which are hereby incorporated by reference as though fully rewritten herein. The MANE emulator is a mobile ad hoc network emulator that provides the ability to emulate dynamic link connectivity between emulated mobile nodes in a laboratory test bed. MANE runs on a network of servers, each of which hosts a number of client test nodes (TNs) as shown in FIG. 1(A). The servers LAN approach support emulation scalability. It is based upon motion interface upon global positioning system (GPS) reference location data so that the same test tools, methods, and tracing tools can be used in the real world test with actual working GPS components.

MANE runs on a network of servers, each of which hosts a number of client test nodes (TNs). The servers LAN approach support emulation scalability (see FIG. 1A). Although MANE runs on a Linux operating system, the overall design accommodates heterogeneous operating systems among the TNs. Furthermore, MANE is protocol independent, and can support multiple protocols (e.g., IPv4, IPv6, ARP, etc.). The MANE connectivity model provides packet dropping based on the range between individual nodes, the transmission power, and packet size.

MANE components consists of:

(1) Forwarding Engine: This component runs on the MANE servers. It sniffs packets on the servers interfaces, and forwards them to the all other servers interfaces. The forwarding engine interconnects all the emulated mobile nodes (TNs).

(2) Range Model: This component runs on the MANE servers. It generates the connectivity matrix that determines which packets get dropped. The range model works in conjunction with the forwarding engine and creates a dynamic connectivity model on the servers.

(3) GPS Emulator: This component reads position information from scripts for each emulated mobile node and multicasts the positions out to the MANE forwarding engine/range model and to the individual emulated nodes. There is one GPS emulator in MANE, and it resides either on the test bed control node, or on one of the MANE servers.

(4) GPS Daemon: This component resides on each of the emulated mobile nodes. It listens to the GPS emulator multicasts and keeps track of the node position. It can supply GPS position information to applications that require it.

(5) TN Packet Treatment: This component resides on each of the emulated mobile nodes. It emulates the effects of a simple Media Access Control (MAC) scheme by limiting the total amount of inbound and outbound traffic at a test node. This module creates a virtual interface over which all MANET communications must take place. Each of the components obtains testbed configuration information from a common configuration file, which by default is located in /etc/mane.config.

The present invention is also directed to a methodology of creating an ordered list of textual topology definitions to drive, inter alia, the TEALab test bed. For a more thorough description of this test bed, see "TEALab: A Testbed for Ad hoc Networking Security Research," by Mike Little, Telcordia Technologies Inc., Piscataway, N.J. 08854 (formerly known as Bellcore, which had been part of Bell Labs before the breakup of AT&T). At Telcordia, the Tactical Environment Assurance Laboratory (TEALab) created an environment for studying network attacks and attack recognition in ad hoc networking environments. The TEALab environment consists of a collection of mobile ad hoc network (MANET) hosts interconnected via a common networking environment such as an Ethernet (wired or wireless). Each MANET host can be viewed as consisting of four distinct "layers": link layer communications, network-to-link layer filtering, network and transport layer communications, and applications. The link layer communications provides the physical and link layer protocols required to participate with the common networking environment. In a TEALab environment, this is an Ethernet protocol suite. The network-to-link layer filtering provides the functionality that controls whether one host will receive packets from another host. This is accomplished by the use of the netfilter/iptables system software. This software provides a set of hooks inside a Linux operating system that allow execution of software rules whenever network packets traverse the communications interface. The TEALab employs source filtering rules to restrict the in-flow of packets from hosts that are not considered to be next hop neighbors. As such, the environment can be viewed as one in which each host maintains a programmable switch between itself and the other hosts. The TEALab environment employs a Topology Scenario Management program to manipulate these filtering rules in real-time to emulate inter-nodal visibility. This program reads scenario scripts that define the network topology, changes it may undergo and when those changes occur. Thus both static and dynamic topologies can be defined. These topologies can be fully connected. For further details, see "TEALab: A Testbed for Ad hoc Networking Security Research."

Studies of MANET have been conducted using mobility-pattern data, which can be generated by a computer program implementing a mobility model. However, frequently the data is purely time-stamped positions, lacking information about the links among the nodes, and thus insufficiently describe a static or dynamic topology.

Having a desirable dynamic topology meeting a specific need is important in the research, development, test, and evaluation of ad-hoc networks. During early phases of development, having a controllable specific topology is highly desirable because a new technique, algorithm, or mechanism that is being developed may not be ready to operate in any topology. During the last phases of the development, having a different topology is also desirable because it can be used to test and evaluate a newly developed technology in order to corroborate its performance claims. Accordingly, there exists a need for visually designing, editing, manipulating, verifying, and animating desired network topologies and creating desired mobility-pattern data of a mobile ad-hoc network (MANET). A desired network topology of a MANET system is a time-dependent geometrical shape and size of the network that meets at least the following requirements of a research need:

The exact number of participating nodes
Their relative geographical positions
The number of communication links of each node Desired mobility-pattern data are time-stamped mobility traces that define a specific mobility scenario meeting a specific research need.

SUMMARY

The present invention relates to networked communications such as ad-hoc networks, and, more particularly, to visually designing, editing, manipulating, verifying, and/or animating specific virtual network topologies and creating desired mobility-pattern data of a mobile ad-hoc network (MANET). One preferred embodiment of the present invention, characterized as the ARL Topodef™ tool is a graphical system and method for creating, inter alia, virtual network topologies. The preferred embodiment provides the end user an easy way to create a static or dynamic network topology that fits a specific research need. The preferred embodiment of the present invention utilizes mobility models and propagation models, similar to but distinguishable from a modeling tool. The preferred embodiment provides the user a way to experiment with the model parameters, similar to but distinguishable from a traditional simulation tool. The preferred embodiment of the present invention uses models to provide the user a convenient way to create a dynamic topology expeditiously and to graphically alter it in order to fit a specific research need. The present invention is direct to a method and system for driving network emulation, simulation or modeling software, such as for example MANE or TEALab, by creating virtual network topologies expeditiously for research purposes. The present invention circumvents the need for extensive and repetitious modeling, emulation, and/or simulation exercises by creating specific/precise dynamic topologies or predefined data for modeling, emulation, and/or simulation software, such as MANE or TEALab. The dynamic topologies and/or predefined data can be inputted into modeling, emulation and/or simulation software to research and/or determine, inter alia, the operational capabilities of the software, while circumventing the need for extensive testing and/or operational runs.

The embodiments herein approach the drawbacks of the conventional approaches in two different ways to create a desired scenario. The first approach accomplishes the objective revolutionarily by completing the mobility data-generation process in reverse order: (1) first graphically designing a desired dynamic topology then (2) generating the mobility-pattern data corresponding to the design. The second approach accomplishes the objective evolutionarily by first (1) simultaneously displaying and generating a dynamic scenario, second (2) visually editing and manipulating the graphical elements depicting a topology to produce a desired result, and then (3) generating the mobility-pattern data corresponding to the design.

One preferred embodiment of the present invention stores the specifications of each topology in a mutable composite data structure called a list, which is an ordered collection of designed topologies. Within the context of the embodiments herein, the list can be embodied as an electronic flipbook in which every page has the required specifications of a topology. Each topology is associated with an ordinal number called an index indicating its ordered position within the list. The index is used to select a topology in the list. Once a topology is saved in the list, it can be retrieved, modified, updated, removed from the list, or relocated to a different location within the list. An n-topology list can be permuted to create n-factorial (n!) different scenarios.

In one preferred embodiment an animation of the dynamically changing topologies can be accomplished by successively displaying each topology in the list, automatically or manually. The topological specifications in the list are used to generate textual definitions of a dynamic scenario using a scenario definition language (SDL) that has its origin from the visibility commands embedded in the 'visibility database' of a communications scenario generator. The rules for generating the scenario definitions are described in the Appendix A herein. The embodiments herein can also be used for creating topologies that are suitable for the study of other types of ad-hoc networks, including sensor networks, wireless mesh networks, cellular, and peer-to-peer (P2P) networks.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The present invention presents a method for graphically animating and editing mobility traces of a mobile ad-hoc network (MANET) and for transforming them into a dynamic topology. The employed mobility traces comprise time-stamped positions of each participating node in a MANET, and can be structured differently in diverse file formats and from different sources. The files storing data of mobility traces may, for example, comprise "tick" files created by Sparta, Inc., Qualnet/Glomosim files generated from the Generic Mobility Simulation Framework (GMSF) of the Swiss Federal Institute of Technology Zurich (ETH Zurich), "AHAS" files obtained from field exercises, and/or created files storing specifications for creating an emulated topology.

The presented invention enables the use of externally generated mobility traces to serve three major research purposes: (1) providing graphical aid in understanding movement patterns, (2) animating a dynamic network topology, and (3) creating derivatives of the existing traces to fit a particular need using an internally developed Topodef tool. Detailed data structures of the mobility traces and image snapshots of a mobility scenario are described in the following detailed description of preferred embodiments, using the preferred methodology, leveraging of existing resources, and reusing mobility traces. Thus, the present invention reduces internal development efforts and enables the try-out of mobility scenario developed by others more conveniently.

BRIEF DESCRIPTION OF THE DRAWINGS

The embodiments herein will be better understood from the following detailed description with reference to the drawings, in which:

FIG. 8 is a graphical illustration the parameter values of the Random Walk model.

FIG. 9 is a graphical illustration of a user-defined path option and required parameters for using the user-defined path option.

FIG. 21 is a graphical illustration showing the step of selecting the Delete Link menu item to delete an existing link.

FIG. 22 is a graphical illustration showing the step of selecting the menu item "Set Attributes" of a node.

FIG. 23 is a graphical illustration revealing the attributes of an exemplary mobile node.

FIG. 29 is a schematic diagram illustrating attributes of a mobile node according to the embodiments herein;

FIG. 34 is a schematic diagram of a computer system according to the embodiments herein.

DETAILED DESCRIPTION OF PREFERRED EMBODIMENTS

Figure 1:
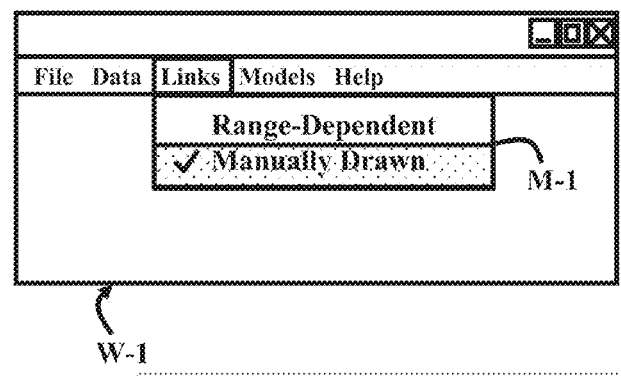
FIG. 1 is a graphical illustration of an on-screen menu for choosing the option to create arbitrary links.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a technique for designing topologies for emulating a MANET. The present invention is intended primarily for use in laboratory environments, however, its use is not limited to laboratories and may be expanded beyond its primary use as a research tool. The present invention was primarily designed to support two different types of emulation test beds: the TEALab and the MANE testbeds. However, the principles of the present invention can be practiced in a variety of other types of test beds.

The main function of an emulation test bed is to create virtual dynamic network topology using a stationary network. Both the TEALab and MANE test beds are functionally equivalent, but architecturally different and require different inputs. The TEALab employs a packet-filtering system tool to control the incoming data packet at a given network interface of a test node to determine network connectivity using a set of textual network topology definitions, specifying which node is connected to which node.

On the other hand, the MANE test bed uses a range model and depends on the distance between two nodes to determine the interconnection between them. The distance is computed using the geographical locations of the two communicating nodes. The present invention is designed and implemented to create a set of time-stamped positions of all the participating nodes. Each time stamp is associated with the creation of a topology at that time. A series of time-stamped positions is associated with the creation of a virtual dynamic topology of a mobile ad hoc network (MANET).

A preferred embodiment of the present invention utilizes the Python programming language to express logical and mathematical operations and the Tkinter graphical user interface (GUI) modules/libraries that come with the utilized language, however, other program languages could be utilized to implement the principles of the invention. The invention logic of the preferred embodiment relies heavily on the functional features of the GUI, especially the exploitation of the user-created events.

In a preferred embodiment, an event is generated whenever the user presses one of the mouse buttons: the left button or the right button. The left button is used (1) to select a graphical object being displayed on the screen and (2) to drag an object on the screen. Dragging is performed by pressing the left button and moving the mouse to another place on the screen.

If there is no event, then invention enter a waiting state, doing nothing but waiting for an event to occur.

In a preferred embodiment, the system reacts to each user-generated event by binding a special function that is created to handle a particular event. The name of the special function is registered with the GUI system, telling the system to use the registered function to handle a particular event. The special function is often as a callback function. For example, if the onLeftClickReleased function is registered with the system to deal with the releasing of the left-mouse-button event.

The event-driven programming technique is widely used to develop GUI-equipped computer applications. For a computer application that does not have a GUI, it often has a flow of actions from top to bottom, ending a session. A GUI application often needs a user-generated event to perform a certain action.

Figure 25:
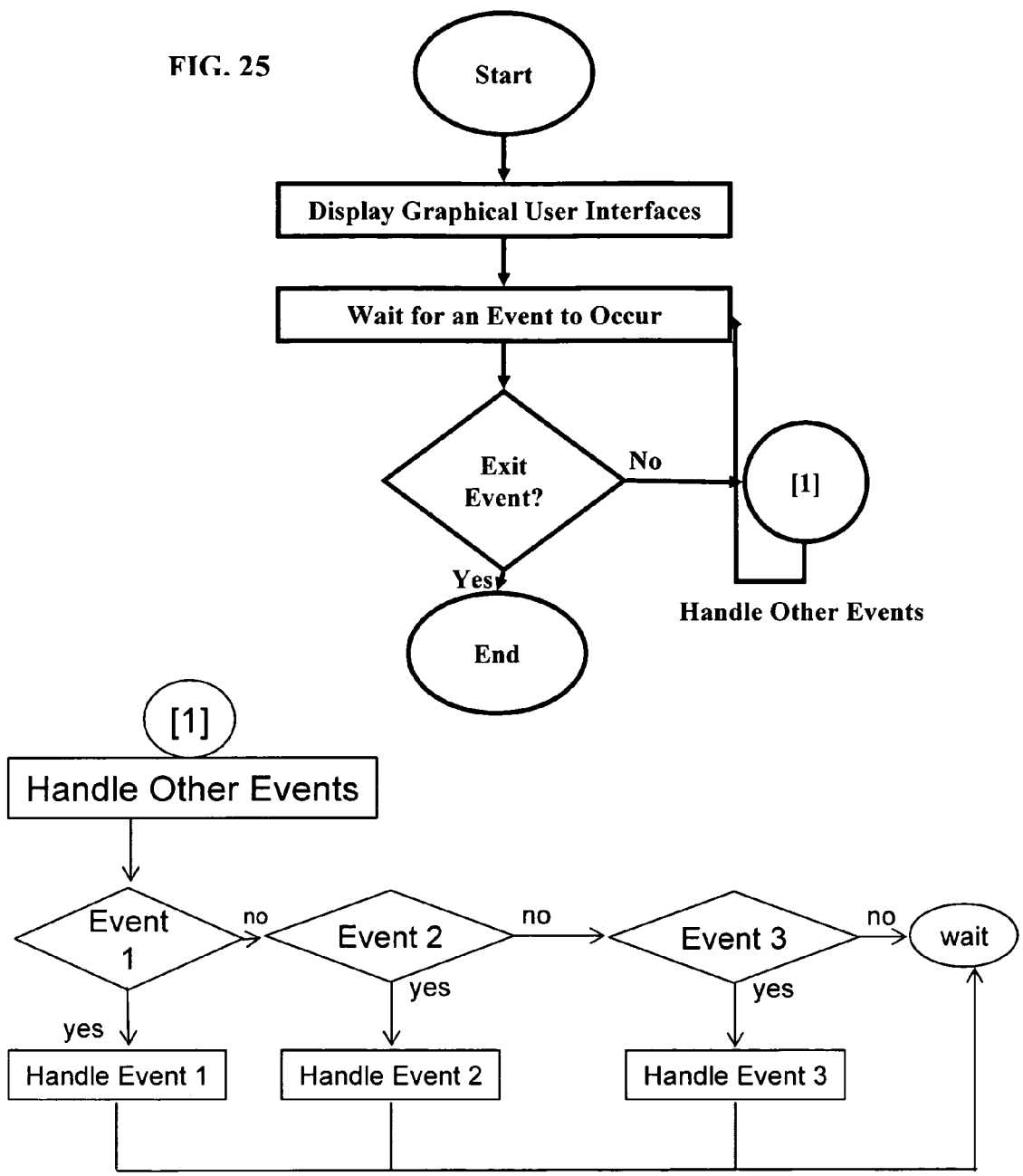
FIG. 25 is a graphical illustration of a flow chart showing the event driven sequencing principle of preferred embodiments of the present invention.

Whenever an event occurs, the employed GUI system invokes the callback function and pass an event object whose attributes include the location on the canvas where the event occurred; i.e., event.x, event.y. FIG. 25 contains flowcharts of some event-handling activities.

I. Manual Mode

The manual creation of a network topology is intended to support emulation test beds that use a packet-filtering system tool to control the incoming data packet at a given network interface of a test node; e.g., the TEALab test bed. This type of test bed is capable of creating a data link between any pair of two nodes regardless of the distance between them. The mobility traces can be extracted from the defined topology and used for other types of test beds; however, the interconnection links between any two nodes may be different, depending on whether the test bed would consider the distance between them. For example, the distance between any two nodes is a dependent variable in the MANE test bed; therefore, although the mobility traces can be reproduced in the MANE test bed, the interconnection links may be different, depending how the manual creation of the links was accomplished.

The manual creation of a dynamic topology can be accomplished using the graphical display shown in FIG. 1, wherein choosing the option to create arbitrary links is accomplished in a window W-1 by the selection of manually drawn (as opposed to range) from drop-down menu M-1.

Figure 2:
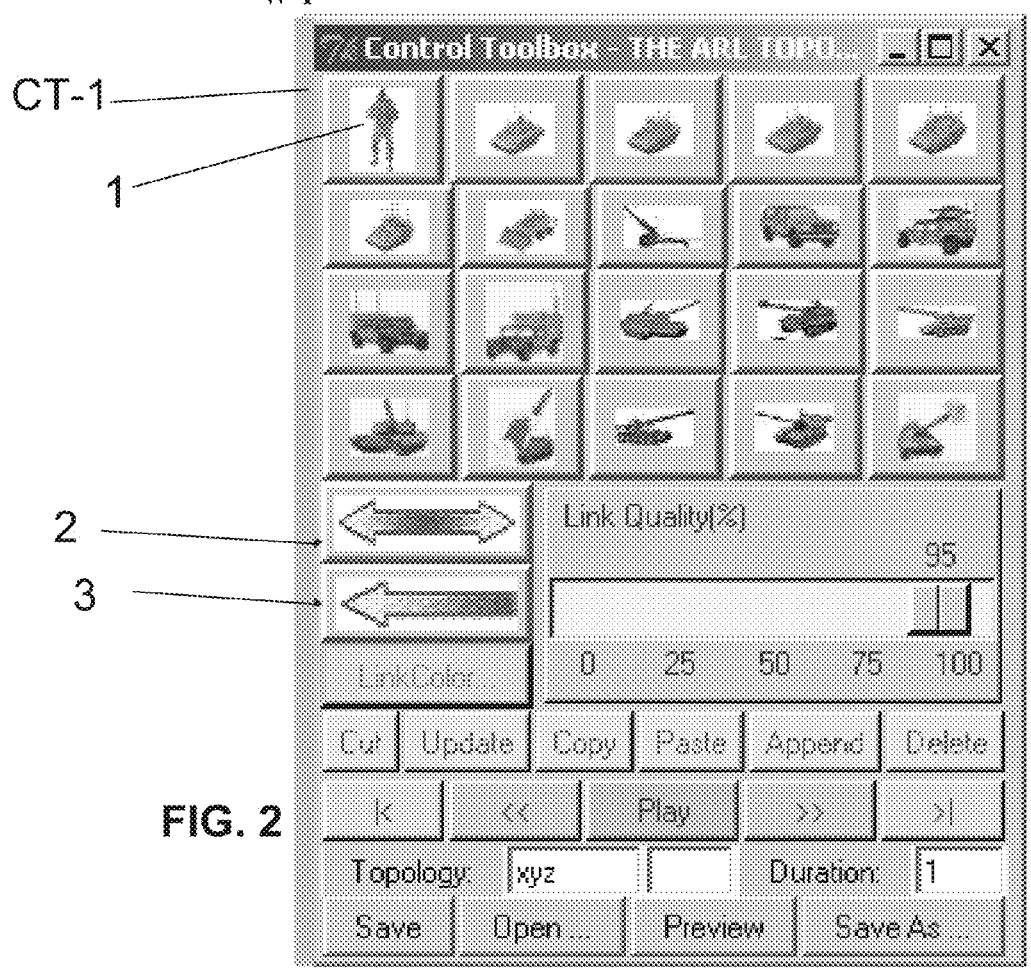
FIG. 2 is a graphical illustration of an on-screen window showing icon images for creating/representing nodes and links and a graphical illustration of the Append button for adding a network topology to the scenario being designed.

FIG. 2 illustrates the step of selecting icon images representing nodes 1 and links 2 and 3. This may be accomplished by the steps of (1) Selecting the option to create arbitrarily link. This invention reacts to this selection by setting the internal function that performs the link creation to do nothing, effectively disabling the automatic creation of a link between two nodes. (2) Selecting an icon is a user action. It is accomplished by moving the mouse cursor to the tool box and clicking one of the displayed icons; e.g., a soldier, a tank, or a double-headed arrow.

The sequential actions taken in a preferred embodiment of the present invention for the above actions are described briefly below:

(A) The function/method "onSelected ( )" is executed when the clicking of the left mouse button event occurs.

(B) The function then calls the function "get_selected_icon_image" to retrieve the information about the selected icon.

(C) It then inspected the retrieved value to determine whether an icon has been selected.

(D) If this is True, then it sets an internal Boolean flag called "no_selection" to the value of False.

(E) Then it sets its operational state to be NODE_CREATION, or ASYM_LINK_CREATION, or SYM_LINK_CREATION, depending whether the selected icon represents a Node or a Symmetric Link or a Bidirectional Link.

The computer code implementing the above functions is shown in the APPENDIX A-1-Manual Mode.

Node Creation

In a preferred embodiment of the present invention, the creation of a node is accomplished by simply moving the mouse cursor to the screen/canvas and clicking the left mouse button at the desired cursor location. When the left mouse button is released, the selected node icon is placed on the screen at the current cursor location. The process is repeated until the number of nodes reaches the desired value.

The computer code that handles the creation of a node is part of the code that deals with the user-created event: releasing the left mouse button. Thus, the code is part of the onLeftClickReleased function, which calls the node_create function to create a node.

The node_create function then sets up a set of attributes before calling the node_instantiate function to actually create a node. The attributes include the pixel locations of the mouse cursor when the event occurred (event.x, event.y). The program then later transforms the pixel coordinates into the world coordinates and a textual definition defining the location of a node; e.g., on 03 position 44.4744564699 33.3281811324 (node 03 is located at longitude 44.4744564699 and latitude 33.3281811324).

The computer listing for implementing the above node creation functions is set forth in APPENDIX A-2, under NODE CREATION Link Creation In a preferred embodiment of the present invention, the creation of a link consists of performing two steps:

(A) Step 1: Selecting an icon representing a unidirectional/asymmetric link or a bidirectional/symmetric link.

(B) Step 2: dragging the mouse cursor between two nodes. The dragging is performed by pressing and holding the left mouse button, moving the cursor from one node to the other node, and then releasing the left mouse button to complete the dragging.

Figure 3:
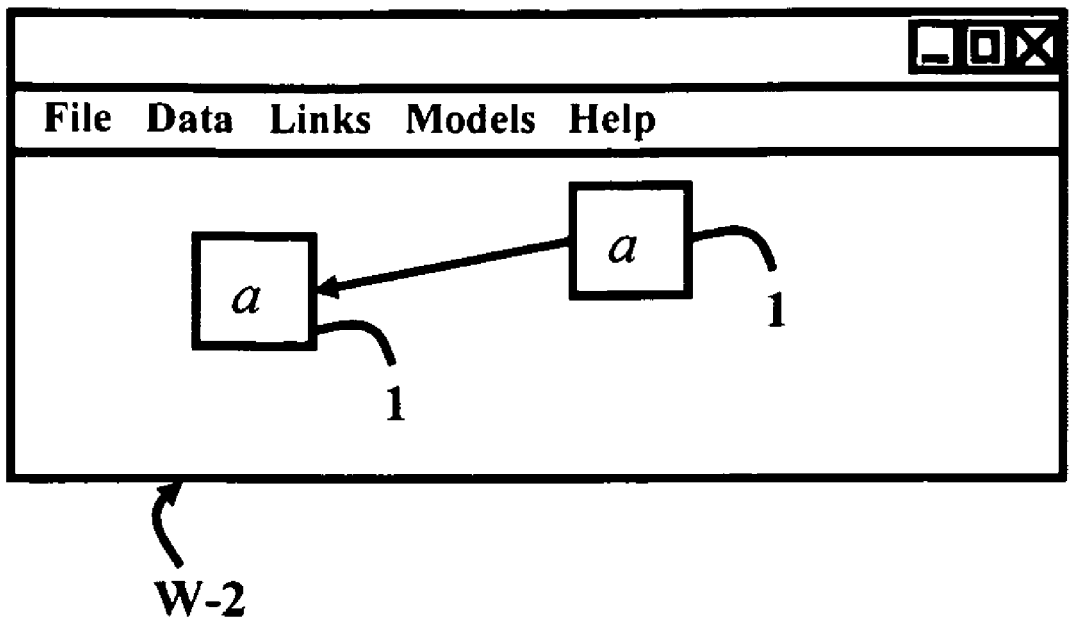
FIG. 3 is a graphical illustration of an on-screen window showing an asymmetric link.

An asymmetric link is represented by a single-headed arrow (←). The head of the arrow rests on the outer edge of the icon representing the receiving node, and its tail rest on that of the transmitting node as shown in FIG. 3. The invention automatically transforms this graphical representation into the textual topology definitions "on 01 accept 02 inbound" and "on 02 deny 01 inbound" connoting that node 01 can receiving data transmitted by node 02, but node 02 cannot receive data transmitted by node 01. FIG. 3 is a graphical depiction of an asymmetric link.

Figure 4:
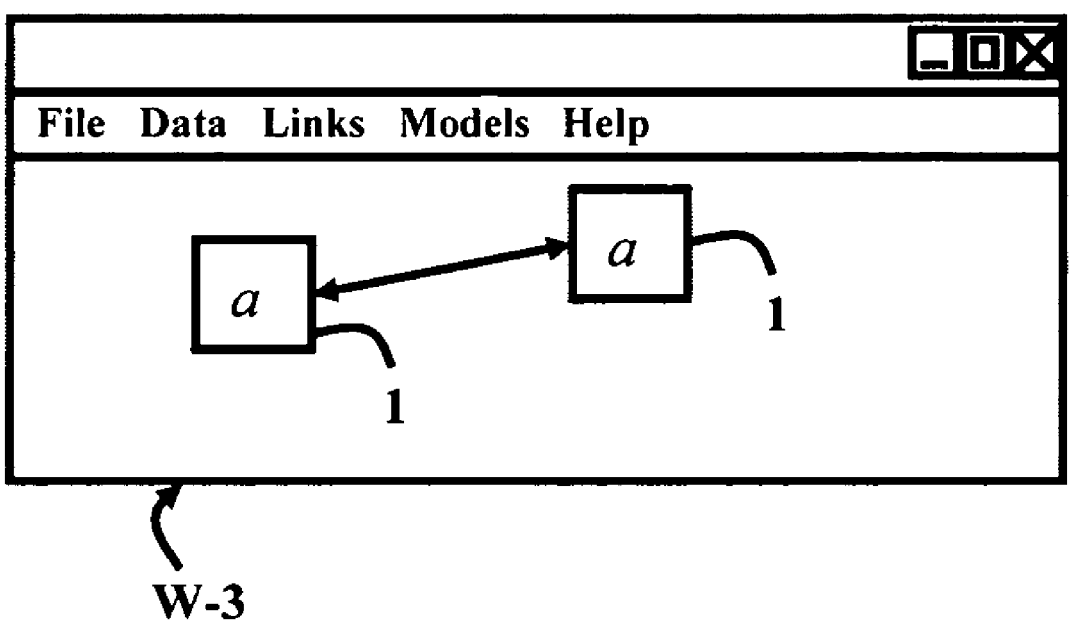
FIG. 4 is a graphical illustration of an on-screen window showing a symmetric/bidirectional link.

FIG. 4 illustrates a symmetric link represented by two single-headed arrows pointing in opposite directions or two opposite single-headed arrows forming to look like a double-headed arrow (⇆). The current implementation uses a double-headed arrow to meet the preference of its users. The heads of the arrows rest on the outer edge of the icons representing the two communicating nodes as shown in FIG. 4. The invention automatically transforms this graphical representation into two textual topology definitions "on 01 accept 02 inbound" and "on 02 accept 01 inbound" connoting that node 01 and node 02 can receive data from each other.

The manual creation of a link is repeated until it meets a specific design. For example, the number of links connected to a specific node. Each time a link is created, a MouseDragging event is generated, and the invention handles that event by drawing a single-headed arrow or a double-headed arrow between the two communicating nodes, depending on whether the selected icon image representing the type of the link, asymmetric or symmetric.

Stationary Topology Creation

The manual creation of a network topology is accomplished by manually creating the number of nodes and the number of links as described in the above sections. The creation of topology is completed by exercising an option to assign a value indicating the lifetime (duration) of the topology. The default value is one second, which is the lowest value. The assignment is done by typing in an integer into the entry box 5 showing the lifetime of a topology in seconds as indicated in the FIG. 5.

Dynamic Topology Creation (Scenario Creation)

Figure 5:
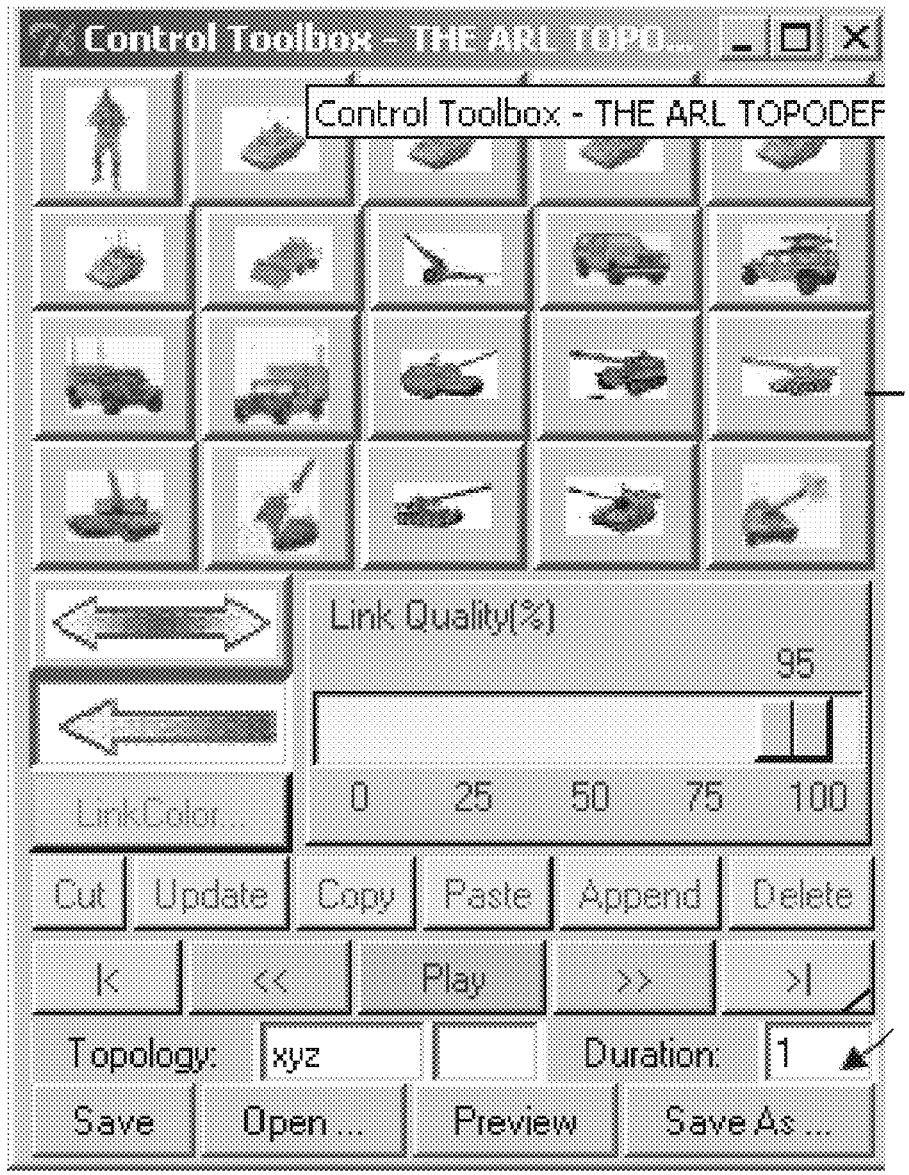
FIG. 5 is a graphical illustration of a box indication and specification of the lifetime of a topology.

FIG. 5 also illustrates the manual creation of a dynamic network topology, which is also known as a scenario. The creation is accomplished by manually creating the number of stationary network topologies as described in the above sections and placing them in a data structure called list. Using the Append button 6, the current topology being designed is appended to the end of the list representing a scenario. Each time a stationary topology is completed, the user needs to press the button 6 labeled "Append" to insert it into the end of the internal list data structure that stores an ordered list of the designed topologies as shown in FIG. 5. To summarize, a dynamic scenario is implemented as an ordered list of discrete stationary topologies.

II. Automatic Mode

Aumatic Node and Link Creation (Topology Creation)

Figure 6:
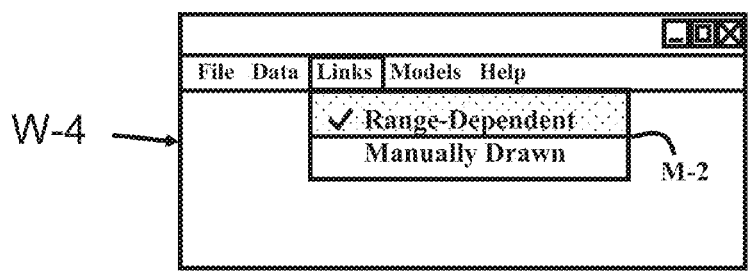
FIG. 6 is a graphical illustration of an on-screen menu for choosing the option for range dependent criteria.

The automatic node and link creation (topology creation) option requires the option "Range-Dependent" be selected as shown in FIG. 6 from menu M-2.

The automatic creation of a dynamic topology of a MANET system relies on mathematical models to generate time-related positions of the participating nodes and to determine the existence of a link between any pair of two nodes.

To generate the required time-related positions, the preferred embodiment (1) uses a widely used model called the Random Walk model and (2) provides the user with a graphical way to specify a path for a node to travel. Additional mobility models can be integrated into the preferred embodiment if desired.

To determine the existence of a link between any pair of two nodes, the preferred embodiment uses two different types signal propagation models: (1) the free-space loss model and (2) the fixed range model. Incorporation of additional propagation models is optional if desired.

Random Walk Model

Figure 7:
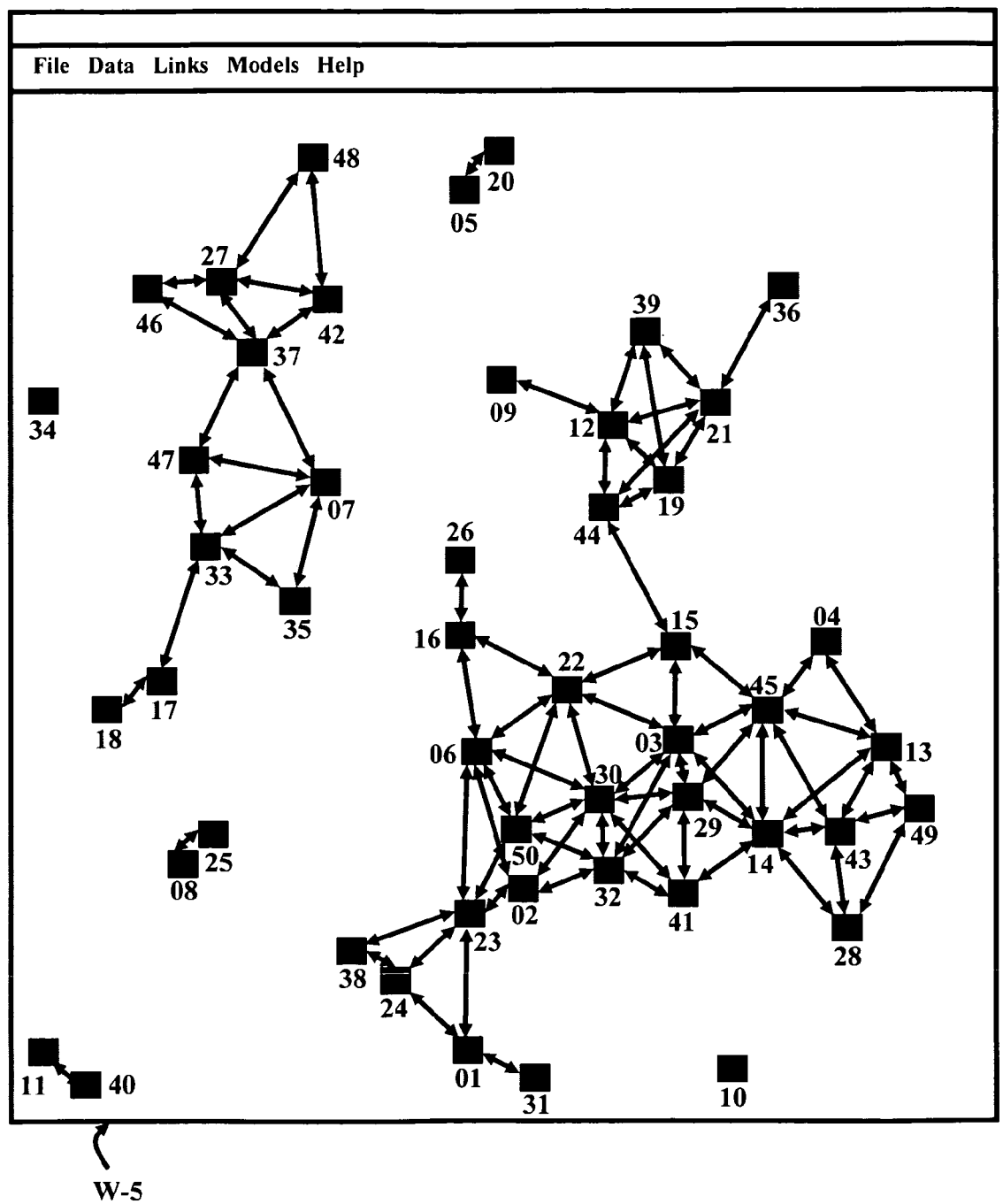
FIG. 7 is a graphical illustration of a Random Walk—a network topology.

FIGS. 7 and 8 reveal the Random Walk network topology and its parameters. When the Random Walk model is selected by the user, the preferred embodiment utilizes a pop-up window W-5 to enable the user to enter or change the default parameters of the model as shown in FIG. 8. A topology created by the model is shown in FIG. 7.

The implementation of the Random Walk model utilizes three main functions: data_generator, node_create, and create_topology. The data_generator function is the main driver. It performs the following actions:

Compute the lifetime (duration) of each topology by dividing the scenario run time by the number of topologies (duration=run_time/num_topo); e.g., using the values in FIG. 8, the lifetime of each topology is 1 second (300 seconds/300 topologies).

Use a tiny icon if the number of nodes is greater than 48 to improve the visualization of a large mobile ad-hoc network.

Create a virtual MANET by creating the number of participating nodes specified by the user; e.g., FIG. 8 shows that the generated MANET has 50 mobile nodes. The creation of each node is accomplished by calling the node_create function.

Create a dynamic topology by creating a fixed number of discrete topologies as specified by the user; e.g., FIG. 8 shows that the dynamic scenario has 300 discrete topologies. Each discrete topology is generated by calling the create_topology function.

The node_create function performs the following main actions:

Create a new node and assigns it with a random location expressed in pixel coordinates, a random direction angle between the user-specified minimum and the maximum values, a random speed between the user-specified minimum and the maximum values. If the variable tiny_icon is set, then it assigns the smallest node icon image to represent the new node.

Call the function node_instantiate to instantiate a node with the newly created attributes consisting of speed, direction, and current location. If the icon name is a soldier, then it adjusts the moving speed to a maximum of 2.5 miles per hour (1.11767 meters per second).

Having instantiated a new node, it then calls the currently selected link-creation function that applies the results of the selected propagation model to automatically create a link between the new node and its neighbors if any. The link creation computes the distances between the newly created node and its neighbors. If the distance is less then the given or computed maximum radio transmission range, then a link is established; otherwise, no link should exist. The decision includes the removal of an existing link if it exists. The link creation will be further described in subsequent sections.

The create_topology function performs the following actions:

For each mobile node in the network, compute the distance it moves from the previous time stamp to the current time stamp. The difference in time is the duration/lifetime of the topology; i.e., distance_moved=speed×duration Reverse the moving direction of the node if it moves beyond the border of the screen.

Update the link between the current node and its neighbors by computing the distances from the new position to the positions of its neighbors. If the distance is less then the given or computed maximum radio transmission range, then a link is established; otherwise, no link should exist. The decision includes the removal of an existing link if it exists. The automatic link creation will be further described in subsequent sections.

Update the graphical elements on the screen by repositioning them at the newly computed positions.

The source code implementing the Random-Walk model is included in Appendix A-3.

User-Defined Path

When the User-Defined Path option is selected by the user, the invention performs the following actions:

(A) Pop up a dialog window showing the current values of the parameters that option needs to generate a scenario as shown in the FIG. 9.

The parameters include the number of nodes, run time, node speed, and lifetime of each topology. The number of topologies is calculated by dividing the runtime by the duration; i.e., number of topologies=run time/topology_lifetime Immediately after the user presses the OK button, the invention creates a virtual network of mobile nodes and displays them on the screen. The interconnection links are also automatically determined if the Range-Dependent link option is selected.

The program then waits for the user to define a path for a particular node to move.

Figure 10:
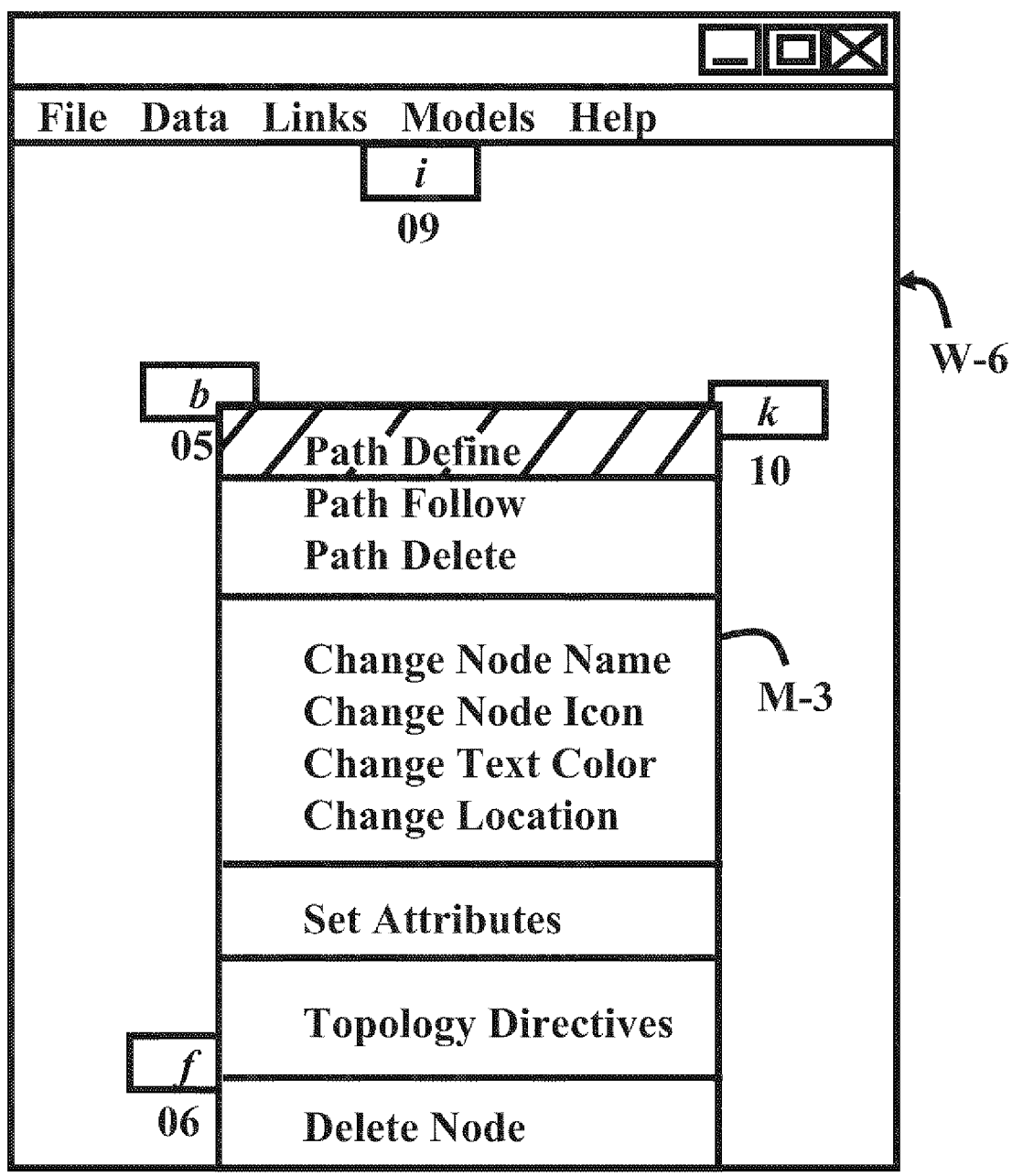
FIG. 10 is a graphical illustration of the step of selecting the option to create a path for a mobile node.

Defining a path is done by clicking the right button while the cursor is pointing at a particular node. The menu appears as illustrated FIG. 10.

The user defines a path by first selecting the Path Define menu option. The pop up menu will then disappear immediate after the user selected the option. The user then moves the mouse cursor to a location and pressing the left button to create a set of points along the defined path. The newly created path for node 10 is show in FIG. 11. Each node can have its own path.

Figures 11, 13:
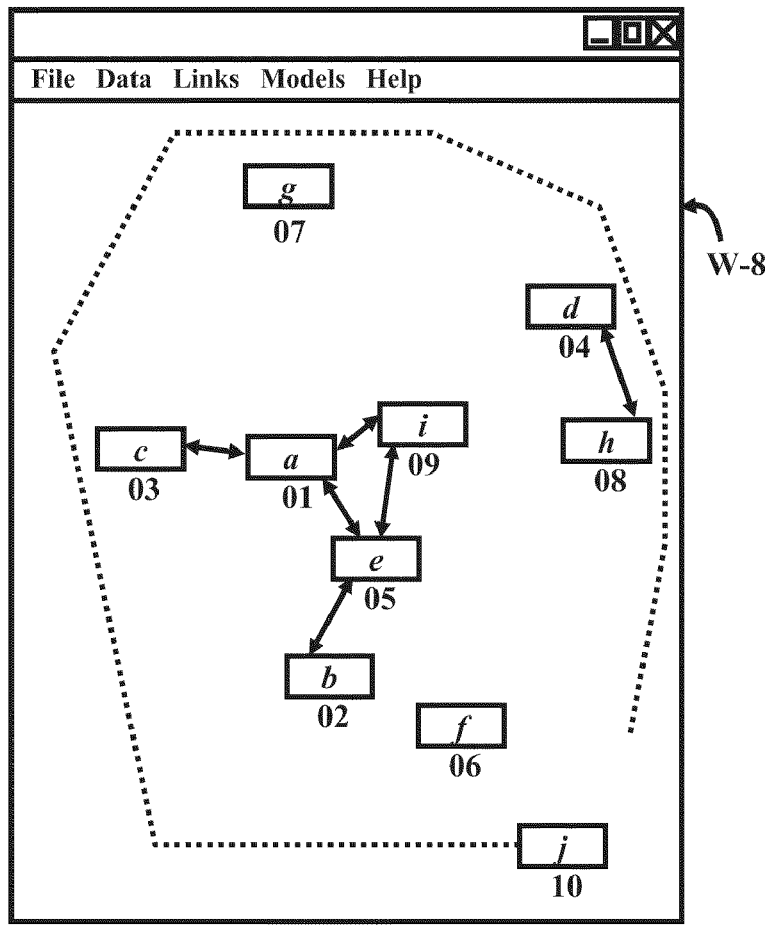
FIG. 11 is a graphical illustration of creating a newly created path for node 10 to travel.
FIG. 13 is a graphical illustration showing the parameters of the free-space-loss model. s
Figure 12:
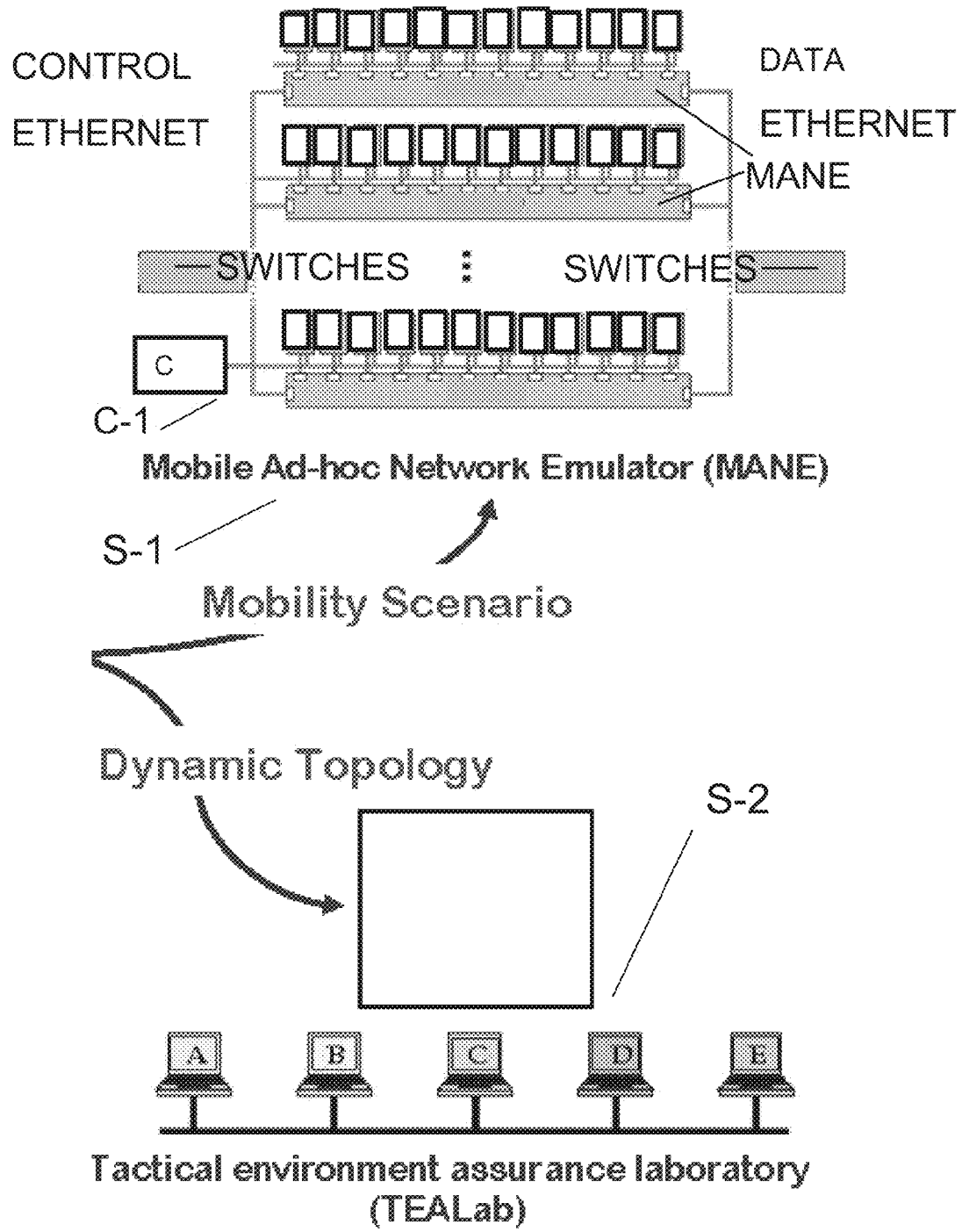
FIG. 12 is a graphical illustration of a mobility scenario using a MANE network emulator and a dynamic topology definitions using the TEALab network emulator.

To generate a scenario, the user then moves the cursor to a node that has a defined path, e.g., node 10 as shown in FIG. 11, then pressing the right mouse button to pop up a menu options. The user then selects the option "Path Follow"

Once the "Path Follow" option is selected, the invention then uses the given speed to travel along the path. Each movement of the node involves the calculation of distances between the moving node and its neighbors. The distances are then used to determine the possible existence of a communication link. The source code is included in APPENDIX A-4.

Automatic Link Creation and Destruction

The existence of a communication link between two nodes is determined by the distance between them and the application of a radio-frequency signal propagation model. The distance calculation relies on an existing geodesic distance calculation library called "Geodesy Foundation Class" which is available on the Web (http://www.samblackburn.com/gfc/).

The radio-frequency signal propagation model is used in the invention to derive the maximum range that a radio can transmit its signal. Two models are now used in the invention: (1) The free-space-loss (FSL) model and (2) the fixed-range model. The invention is designed to accommodate additional propagation models in the future.

When the FSL model is selected, it pops up a dialog window for the user to see the current values of the parameters and to change them if necessary. A screenshot of the dialog window is shown in FIG. 13, wherein name value pairs of the free-space-loss model are generated.

The calculation of the maximum transmission range depends on the selected propagation model. For example, the free-space-loss model uses the following formula:

$$\text{max\_range} = \text{speed\_of\_light} * sqrt(gtx * grx * \text{pow\_tx}/\text{pow\_rx})/(4.0 * \pi * \text{frequency})$$

Figure 14:
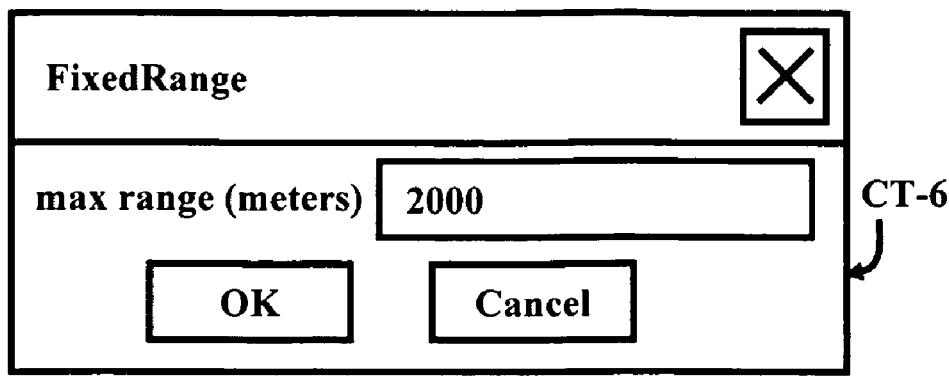
FIG. 14 is a graphical illustration of an entry box for entering the maximum range of the fixed-range model.

No calculation of the maximum transmission range is required for the fixed-range model; it uses the user-given value of the maximum range; e.g, max_range=2000 meters as shown in FIG. 14, depicting the entry box for entering the maximum range of the fixed-range model.

The automatic determination of a communication link between two nodes is determined by the following steps:
  Compute the geodesic distance between two node, e.g., distance
  Calculate or retrieve the user-specified maximum transmission range, e.g., max_range
  Compare the values of distance and max_range
    If distance<=max_range, then a link is established.
    Else if distance>max_range, then
      If a link already exists, then remove it;
      Else a link cannot be established.

The automatic determination of the interconnection links of an N-node mobile network is repeatedly calculated N×(N−1) times; e.g., if the network has 100 nodes (N=100), then there are 100×99 decisions to make. If a mobility scenario consists of 1000 topologies, then there will be 1000×100×99 decisions to make. The complexity of the link calculation is a quadratic function; e.g, doubling the size of network quadruples the number of times a link calculation and decision has to be made. Without the invention, manually defining a topology is practical only for a small network consisting of a few nodes. Doing so for a large network would be impractical and error-prone. The invention obviates the manual process.

Semi-Automatic Mode

This mode is a mixed between manual and automatic modes. The automatic generation of nodes uses a mobility model; e.g., the random-walk or the user-defined path model, which has been described in the preceding paragraphs.

The automatic creation of interconnection links uses a radio-frequency signal propagation model; e.g., the FSL model or the fixed-range model, which has been described in the preceding paragraphs.

Automatically generating Nodes, Manually Creating Links

Figure 15:
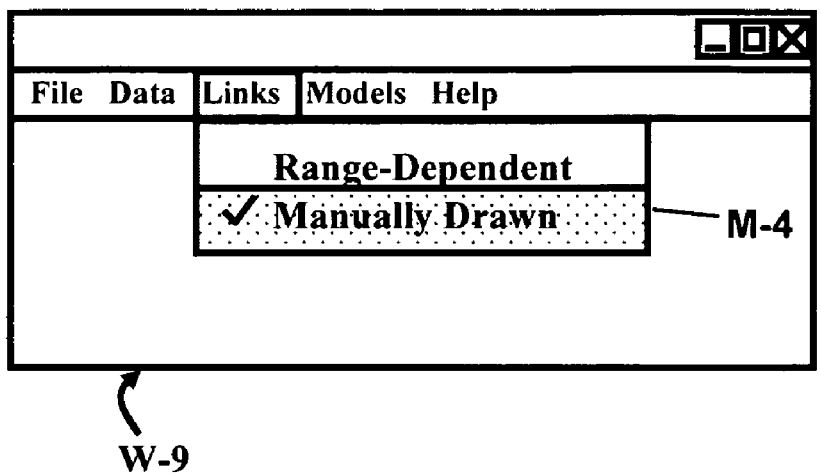
FIG. 15 is a graphical illustration of the step of choosing the option to create communications links manually.
Figure 16:
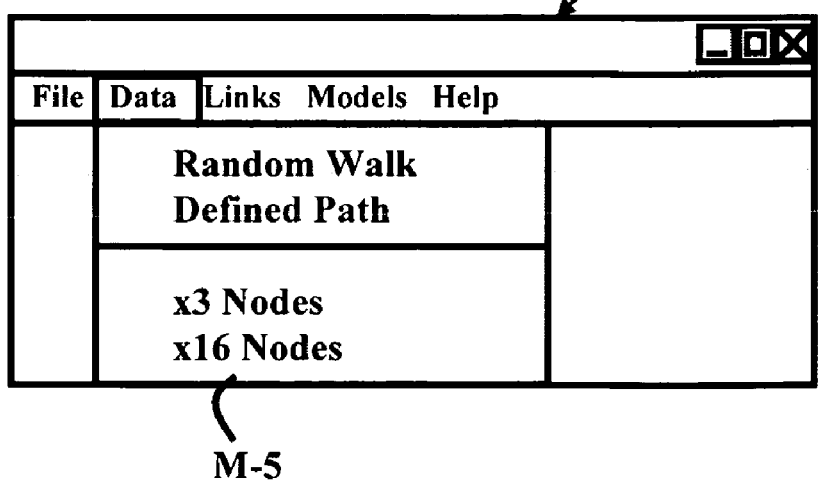
FIG. 16 is a graphical illustration of the step of choosing a mobility model.

The invention provides the user with GUI to select this operational mode. This mode requires that the user to perform the following actions:
  Select the option to create the links manually as illustrated in the FIG. 15 wherein the choosing of the option to create communications links manually is illustrated. When this selection is selected, the invention disables the automatic generation of communication links.
  Select a mobility model either the Random Walk or the Defined Path model as illustrated in FIG. 16. The functional behavior of the two currently implemented models is described in the previous paragraphs. When either one is selected, a mobility scenario is created without any interconnection links; i.e., the invention only generates time-stamped positions of the participating nodes.

Figure 17:
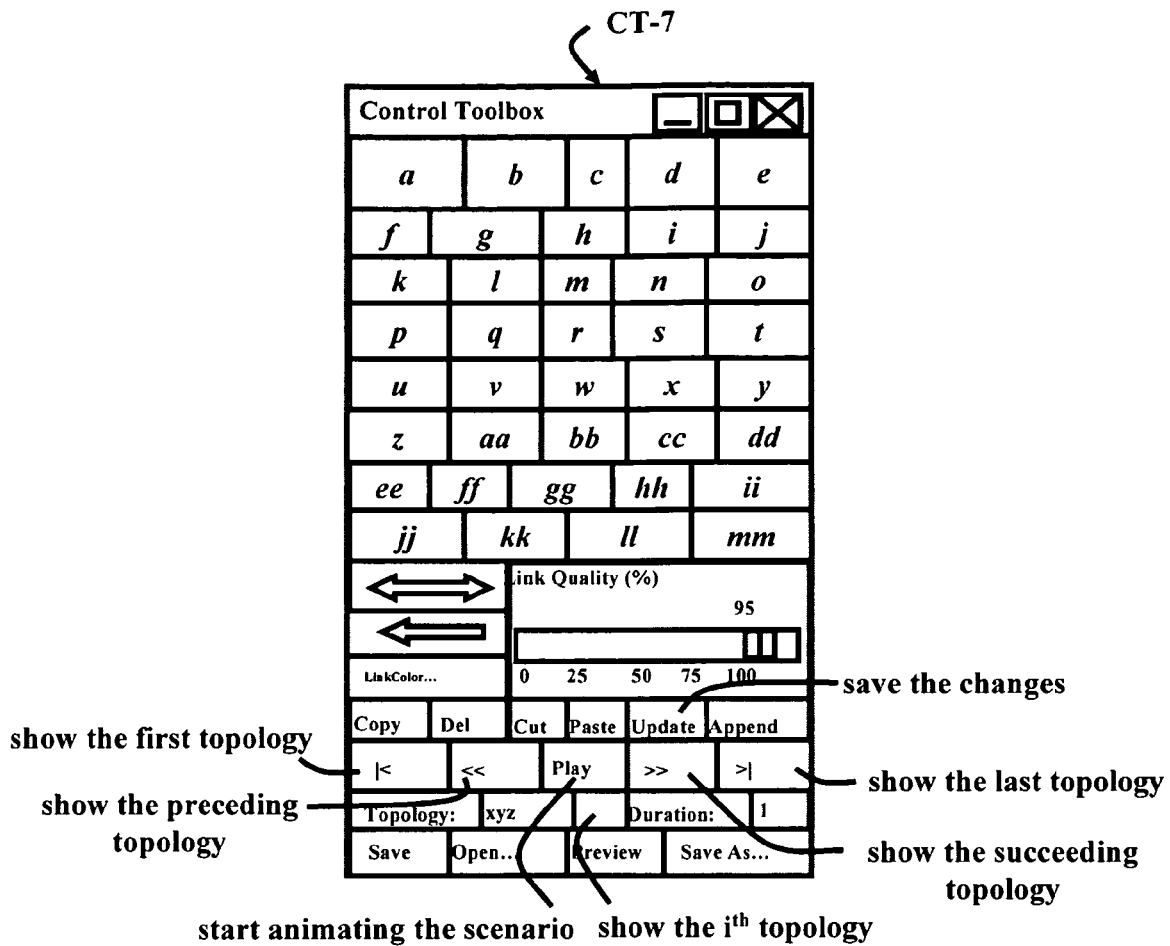
FIG. 17 is a graphical illustration a box revealing a navigation tool for traversing a list of topologies.

Navigating to a topology of interest to create the interconnection links manually by using one of the following features in the tool box, which is illustrated in FIG. 17, illustrating a navigation tool for traversing a list of topologies.

The navigation tool has five (5) action buttons and one entry box.
  The Entry Box. The invention provides the entry box for the user to enter an ordinal number that represents the order of the topology in the list of topologies; a.k.a., the scenario. The value of an entry is an integer that is being used by the invention to access the definition of a topology in the scenario; e.g., topologies[i] or scenario[i]. The scenario is a mutable Python data structure that is indexable; i.e., each item in the list has an associated index, i, which ranges from 0 to list_length −1. For example, if the entry is 5, then the invention retrieves the $6^{th}$ topology from the scenario, the list, and displays it on the canvas; i.e., current_topology=scenario[5].
  The |< Button. The invention displays the first topology in the scenario when this button is pressed; i.e., current_topology=scenario[0].
  The << Button. The invention displays the preceding topology in the scenario when this button is pressed; i.e., current_topology=scenario[i−1] if the index i is greater than 0; otherwise, current_topology=scenario[0]
  The >> Button. The invention displays the succeeding topology in the scenario when this button is pressed; i.e., current_topology=scenario[i+1] if the index i is less than the length; i.e., i<length(list)−1; otherwise, current_topology=scenario[−1]. The −1 index refers to the last item in the list in the Python programming language.

The >| Button. The invention displays the last topology in the scenario when this button is pressed; i.e., current_topology=scenario[-1] The -1 index refers to the last item in the list in the Python programming language.

The Play Button. This is a button that toggles between the "Play" and the "Stop" labels. If the current label is currently Play, then invention reacts to the pressing of this button by changing its label from Play to Stop and starting to display the topology in the list, beginning with the currently displayed topology. Each topology is displayed for duration second. Then it displays succeeding topologies in the list if the >> button was recently pressed or the preceding topologies in the list if the << button was recently pressed. The animation continues until the end of the list or until the Stop button is pressed. When the invention stops animating, it changes the label of this button to Play.

Once a topology of interest is displayed on the screen, a communication link between two nodes can be accomplished by following the operational procedure described in the Link Creation subsection of the Manual Mode section.

Having completed the creation of links for the currently displayed topology, the user needs to save the design by pressing the Update button, which is located on top of the navigation buttons to record changes. Internally the invention transforms the graphical representation of the topology into a set of topology definitions and updates the topology in the list. For example, if the index of the current topology is 5, then the invention does the following:
  Extract the information about links in the topology
  Extract the information about the positions of the nodes in the topology
  Save the extracted information in the scenario; i.e., scenario[5]=current_topology_specifications
The manual creation of communication links continues until a dynamic network topology that is being designed satisfies the needs of the user.

Manually Creating Nodes, Automatically Creating Links

Figure 18:
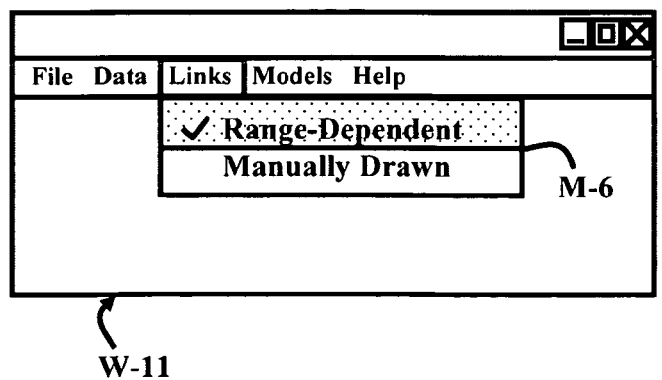
FIG. 18 is a graphical illustration showing the selection of the option to generate interconnection links.
Figure 19:
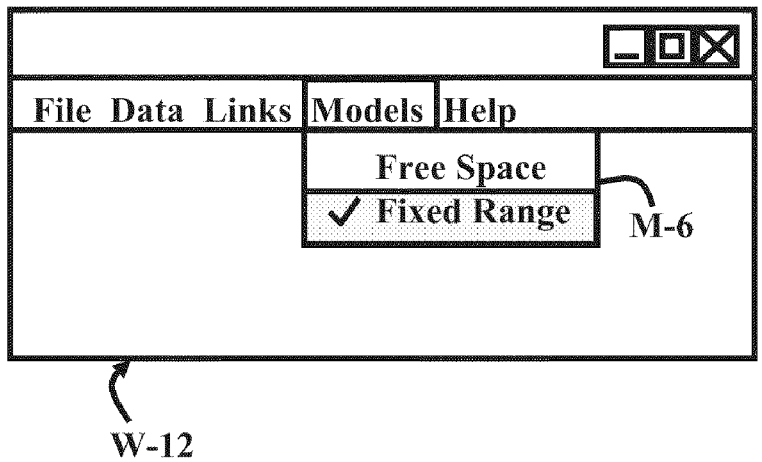
FIG. 19 is a graphical illustration showing the selection of a propagation model.

The invention provides the user a way to create the links automatically by including a propagation model. It also provides a GUI to select the option "Range-Dependent" in the Link pull-down menu and a radio signal propagation model as shown in FIG. 18, wherein the selection of the option to generate interconnections links is illustrated. FIG. 19 shows the selection of a propagation model.

The operation of the propagation models are described in the section entitled "Automatic Link Creation and Destruction" which was described earlier.

The manual creation of mobile nodes is also described earlier in the section entitled "Node Creation" subsection of the Manual Mode section.

Each time a new node is created, the invention internally performs the following actions:
  Compute the distances between the newly created node and its neighbors if any
  Compute the maximum transmission range of their communicating radios if the selected propagation model is not the fixed-range model. If the selected model is the fixed-range model, then use the user-given transmission range.
  Compare the computed distance, dist, with the given or computed maximum range, max range, of the selected signal propagation model between each pair of two nodes.
  If dist<=max_range
    Then create a link between the two nodes by
      drawing an arrow graphical element
        storing the transmitting node object in the internal list of the receiving node, indicating that the receiving node can receive signal transmitted by the transmitting node. Each node has an internal list storing the identification of the transmitting nodes from which it can receive their transmitting signals.
  If dist>max_range
    Then the invention creates no links.

The duration/lifetime of the current topology is set to 1 (second) by default, but it can be changed by the user.

Each completed topology must be added to the list of topologies, the scenario. i.e., using the Python programming language, the computer code is illustrated below:
  scenario.append(current_topology)
The process continues until a specific number of topologies have been successfully created.

Graphical Editing of a Topology

The graphical editing is a manual process using GUI and a computer mouse. The process is intended for custom-designing a specific topology consisting of exact number of nodes located at exact locations and exact number of links. The design criteria are driven by the research needs. The following editing changes affect the currently displayed topology: changes to the size of the network, relocation of a node, and changes to the number of interconnection links.

Changing the Size of the Network

The size of the network changes when a new node is created or an existing node is removed from the current network.

Node Creation

If a new node is created, it is added to the topology. Internal implementation: topology.append(new_node).

Node Deletion

Figure 20:
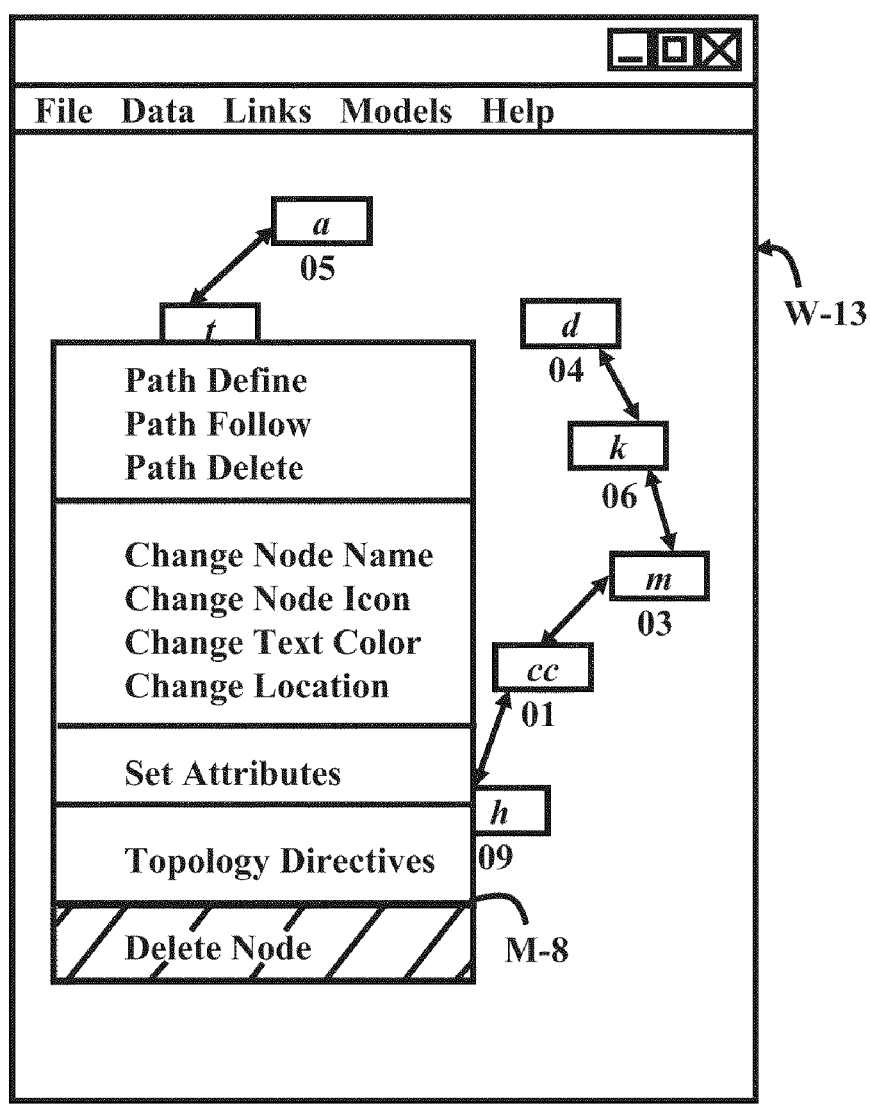
FIG. 20 is a graphical illustration showing the step of selecting the option to delete an existing node.

The invention provides a menu of options for the user to perform on a node. Pressing the right-mouse button while the computer cursor is resting on the icon representing the target node opens the menu as shown in FIG. 20 which depicts the selecting of the Delete Node option to delete an existing node.

Selecting the Delete Node menu item removes the target node from the current topology. The following main actions are performed by the program:
  Erase the graphical elements representing the target node on the screen by deleting them.
  Erase the user-defined path on the screen if it exists by deleting it.
  For each neighbor node whose radio signal can be received by the target node, remove the link from the transmitter to the target node and vice versa. The removal process also erases the graphical element representing a link.
  Remove the node from the current topology. As the network topology is implemented as a Python list, the removal process is done by using the built-in remove function of the list object.

The source code implementing the removal of a node is included in APPENDIX A-5.

Node Relocation

Node relocation affects the network topology because changes to the location of the participating node, which affect the distance between the moving node and its neighbors. When the distance changes, then the number of links may change also depending on the currently selected operation mode; i.e., the automatic or the manual creation of links.

The preferred embodiment of the present invention provides the user a graphical way to relocate a node: pointing the cursor at the target node then dragging it to a new location. Pointing refers to the process of moving the computer cursor to the target node. Dragging is the process of pressing the left-mouse button and moving the cursor. Doing so creates an event called "<B1-Motion>" which occurs when the left button is pressed and the computer mouse is moved by the user. The invention registers this event to the employed GUI system and binds it with an internal function called "onLeftMotion" to handle the relocation event. When this event occurs, the GUI system calls the event handler, the onLeftMotion function, with an event object, which has the location of the cursor (event.x, event.y) when the event occurs. The onLeftMotion function performs the following main actions:

Calling the move function to relocate the node

Calling the currently selected link creation function to determine the existence of a communication link between the moving node and its neighbors.

If the links were created with the option to manually create the links, then only the visualization of the topology is changed; i.e., the existing links remain intact although the graphical elements representing them are stretched or shrinks depending on the distance between the moving node and its neighbors If the links were created with the option to create the link automatically, then creating or destructing an existing is automatically accomplished as described in the AUTOMATIC LINK CREATION AND DESTRUCTION section.

The code that dealt with the onLeftMotion event (node relocation) is included below:
def onLeftMotion(self, event):
. . .
self.move(event.x, event.y, movePath=True)
self.oClient.oLinkOption.get_current_creator( )(self)

The move function relocates the target node by performing the following actions:

Decide whether the newly given location needs to be adjusted. If the new location is located beyond the boundary of the display canvas, then it is set to the location at the edge of the display canvas Compute the incremental distance that the node moves from the previous location to the current location; i.e., dx, dy Call the move function of the employed GUI to relocate the graphical elements by dx pixels in the horizontal direction and dy pixels in the vertical direction.

Update the current location of the moving node

Relocate all the existing links that connect the moving node to other nodes.

The source code of the move function is included in Appendix A-6.

Changing the Number of Interconnection Links

Changes to the number of interconnection links (link density) can be performed in Manual Mode or Automatic Mode. If the link-creation mode is manual, then the following two actions affect the number of links.

III. Manual Mode (Manually Drawn Links)

Manually Creating a New Link

The manual process for create a new link has been described in previous sections (the dragging of an arrow linking between two nodes).

Manually Deleting a New Link

The preferred embodiment provides a pop-up menu to delete a link. The menu appears when the mouse cursor is resting on top of the target link and the right button of the mouse is pressed. FIG. 21 shows the menu for selecting the delete link menu item to delete an existing link.

When the Delete Link menu item is chosen, the preferred embodiment of the invention utilizes the onLinkDelete function to deal with the selected menu item. The function performs the following actions:

Retrieve the source (transmitter) and the sink (receiver) objects;
source=self.get_sender( )
sink=self.get_receiver( )

Call the remove_link function of the sink object to remove the link from the source object; e.g., sink.remove_link (source)

If there is a reverse link, then adjust its size and redisplay it. This is just for visualization purposes.

The source code of the function is included in Appendix A-7.

Automatic Mode (Range Dependent Links

If the link-creation mode is automatic, then the invention performs the following actions:

If the selected RF signal propagation model requires a set of radio parameter values to compute the maximum transmission range; e.g., the free-space-loss model, then the invention provides the user a pop-up menu to change the attributes of the target node. The menu appears when the right button of the mouse is pressed while the mouse cursor is resting on the target node. When the menu appears, select the Set Attributes menu item as shown in the FIG. 22, which illustrates selecting the menu item "Set Attributes" of a node.

Once the Set Attributes menu item is selected, a dialog window appears with name-value pairs for the user to change/set as shown in FIG. 23, which illustrates attributes of a mobile node.

If the free-space-loss propagation model is used then changing the value of one or more of the following parameters will affect the computed range of the transmitting radio:
the power of the transmitter
the sensitivity of the receiver
frequency
the antenna gain of the transmitter
the antenna gain of the receiver Immediately after the OK button is pressed, the preferred embodiment of the present invention then starts re-calculating the maximum range to determine the existence of a link between the selected node and its neighbors. Any changes to the number of links are also visually updated. The automatic link creation/update is described in the Automatic Mode & Link Creation section.

Scenario Manipulation

A mobility scenario is implemented as an ordered list of network topologies. The invention implements the scenario by utilizing the list data structure of the Python computer programming language. The list data structure is a compound data type. It is used to group multiple values. It can be safely called as a resizable array in other computer languages. The invention also utilizes the list data structure to implement a network topology. The implementation of a topology of an N-node network at time t and a scenario or a dynamic topology consisting of n topologies is summarized below.

topology(t)=list([node 0, node 1, node 2, node 3, . . . , node N−1])

scenario=list([topology(t=0), topology(t=1), . . . , topology (t=n−1)])

Each node object tracks a list of neighboring nodes from which it can receive their transmitted signal.

Scenario manipulation refers to the process of (1) re-arranging the order of the topologies in the scenario or (2) changing the size of the scenario (or equivalently changing the number of network topologies in the list).

Re-arranging the order of the topologies in the scenario is accomplished by the cut-and-paste operation consisting of cutting the currently displayed topology and pasting it at a different location in the scenario. This is also called permutation. There n! different ways to re-arrange the order of the topologies in an n-topology scenario.

Changing the size of the scenario is accomplished by deleting the currently displayed topology or designing a new one and inserting it at the end of the scenario.

Manipulation of a scenario often combines both processes: re-arranging the order and changing the size of the scenario.

Figure 24:
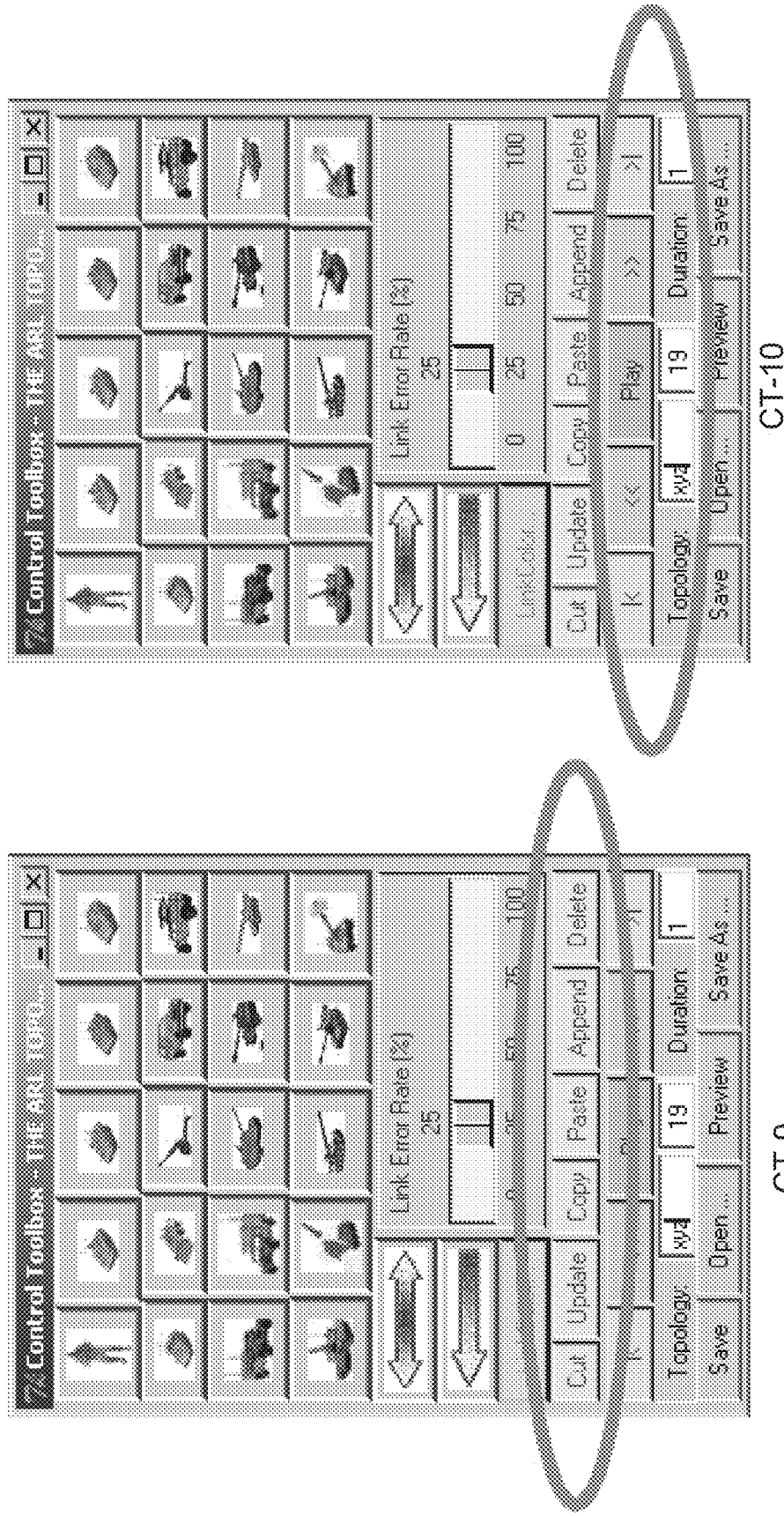
FIG. 24 is a graphical illustration showing control boxes depicting tools for manipulating a scenario and selecting a topology to display.

The preferred embodiment of the present invention provides graphical user interfaces to display and to manipulate a certain topology. The screenshot shown below includes two different toolsets, as shown in FIG. 24, which illustrates tools for manipulating a scenario and selecting a topology to display. The one on the left is used for the manipulation of the designed scenario; the one on the right is for navigating and displaying a topology being stored in the scenario.

The descriptions of the encircled buttons on the right of FIG. 24 have been previously explained (section Error! Reference source not found.). The paragraphs that follow explain the behavior and the implementation of the encircled buttons on the left of the above figure. All actions performed by the user affect the currently displayed topology and the index is always checked for its validity. The index is valid when its value is greater than or equal to zero and less than the length of the scenario; (0<=index<scenario_length)

The Cut Button. Pressing this button removes the currently displayed topology and erases its graphical elements being displayed on the screen. The removed topology is then saved internally. For example, if the order of the currently displayed topology is the $20^{th}$ topology in the scenario (the value of index is 19), then pressing the Cut button removes it from the scenario and displays the succeeding topology, the $21^{st}$ topology, which now becomes the $20^{th}$ topology. The implementation is described below:

Get the current topology index, i
If the index i is valid, then
Save the cut scenario in a internal storage; i.e., saved_topology=scenario.pop(i)

The Update Button. Pressing this button transforms the graphical displays of a topology into the definition of the topology and stores the new definitions in the scenario. The implementation is described below:

Get the current topology index, i
If the index i is valid, then
Update the internal storage; i.e., scenario[i]=topology definitions of the currently displayed topology The Copy Button. Pressing this button copies the currently displayed topology into an internal storage. The implementation steps are described below:

Get the current topology index, i
If the index i is valid, then
Save the cut scenario in a internal storage; i.e., saved_topology=scenario[i]

The Paste Button. Pressing this button inserts the saved topology into the scenario at the location where it is before the current location in the scenario and displays the newly inserted topology on the screen. The implementation steps are described below:

Get the current topology index, i
If the index i is valid, then
Insert the saved topology into the slot before the current index; i.e., scenario.insert(i, saved_topology)
Display the newly pasted/inserted topology The Append Button. Pressing this button inserts the currently displayed topology into the end of the scenario:
scenario.append(topology definitions of the currently displayed topology)

The Delete Button. Pressing this button removes the currently displayed topology from the list and displays the succeeding topology on the screen.

Get the current topology index, i
If the index i is valid, then
Remove the currently displayed topology from the scenario; i.e., scenario.pop(i)
Display the adjacent topology The source code implementing the manipulation of a scenario is included in Appendix A-8.

FIG. 25 is a flow chart of event driven actions of the program that implements a preferred embodiment of the present invention.

When the preferred embodiment of the present invention is first started by its user, it displays a tool box and a canvas. The tool box has rows of icon images representing a node, a link, and editing functions. The canvas is used to display graphical elements representing a topology and for handling graphical editing events.

Upon displaying the two windows, it then waits for an event to occur. If the occurring event is an Exit event, then it stops functioning and exits; otherwise it executes the function that has been registered with the GUI system to handle other events ([1]), as shown in FIG. 25.

In FIGS. 26 through 34, where similar reference characters denote corresponding features consistently throughout the figures, preferred embodiments are illustrated. For the purposes of description, the technique for designing topologies according to the embodiments herein is described as occurring in two existing testbeds: the TEALab and the Mobile Ad-hoc Network Emulator (MANE). The two testbed environments are architecturally different although they both emulate the movement of mobile nodes, effectively creating a virtual dynamic topology of a MANET under test.

The TEAlab testbed requires the running of a network packet-filtering tool called 'iptables' at each participating node. At run time, each node reads and follows a list of textual directives to determine whether it would accept or reject an inbound data packet arriving at its network interface by executing a computer program called "topology scenario manager" (TSM). The TSM tool interprets and translates the directives into iptables packet-filtering commands. These topology directives enable the creation of any logical topology, regardless of the distance between any two nodes.

The topology directives can be manually created using a text editor or automatically generated using the embodiments herein. The manual process is suitable for emulating a small network comprising of a few nodes; however, to emulate a large network, the manual process becomes impractical because the number of directives grows exponentially with the size of the network.

The complexity of writing the directives in terms of the number of lines is a quadratic function of the size of a network, determined by the number of the participating nodes. The complexity increases proportionally to the square of the size of the network because each node in the network must decide whether it would accept an inbound packet from the other nodes. Inspecting, editing, modifying, and verifying the textual directives all are a significant task.

However, using the embodiments herein, the textual directives are automatically generated, and the topology is visually designed, inspected, and verified. The embodiments herein may be embodied as an auto-code generator capable of transforming the graphical representation of a dynamic topology into sequences of textual directives describing a dynamic scenario. In doing so, the embodiments herein also automatically manages the complexity associated with the manual writing process, effectively enabling the user to focus on the graphical design of a topology rather than on the writing of directives.

The MANE testbed employs a set of servers to control the connectivity. Each server is equipped with multiple network-interface cards. The servers listen and capture the periodically broadcasted geographical position location information of each node and use them to compute the distance between each pair of nodes. The servers then compare computed distance with the radio transmission range to determine whether a communication link should exist between the two nodes. If the computed distance is within the radio transmission range, then the servers establish a communication link between the two nodes.

Similar to the creation of the topology-definition directives for the TEAlab testbed, manually creating the time dependent positions of each node is feasible but impractical for a large network or for a lengthy scenario even through the complexity associated with the process increases linearly with the size of the network. Each addition of a new node requires a corresponding file called a 'log' file having a list of time-stamped geographical positions; e.g., time>18: 10: 23.493480 position>77.025032, 43.289992, 0. Visualizing a scenario often requires the use of the real-time JMAP visualization tool running concurrently with the emulation of a scenario in the MANE environment.

Using the embodiments herein, visualization is automatically and simultaneously performed while designing a scenario. The embodiments herein are also a rehearsal tool providing a method for visually inspecting and evaluating a scenario before actual emulation. Therefore, the embodiments herein save resources and enhance productivity. Once a scenario design has been completed and verified, it is used to generate the log files readily for emulation purposes. Besides providing a way to visually create a desired stationary or dynamic topology of an emulated ad-hoc network, the embodiments herein can be used as a convenient and effective tool for demonstration and training purposes.

The embodiments herein enable the rapid design and generation of specific MANET topologies to support emulation. The embodiments herein provide an integrated graphical design and animation tool that provides a user with a method for visually creating, editing, verifying, and animating a dynamic topology of an ad-hoc network. Furthermore, the embodiments herein offers the user an unmatched method by which a dynamic topology of an ad-hoc network can be visually created and automatically transformed into textual descriptions of a desired scenario and mobility patterns.

Figure 26:
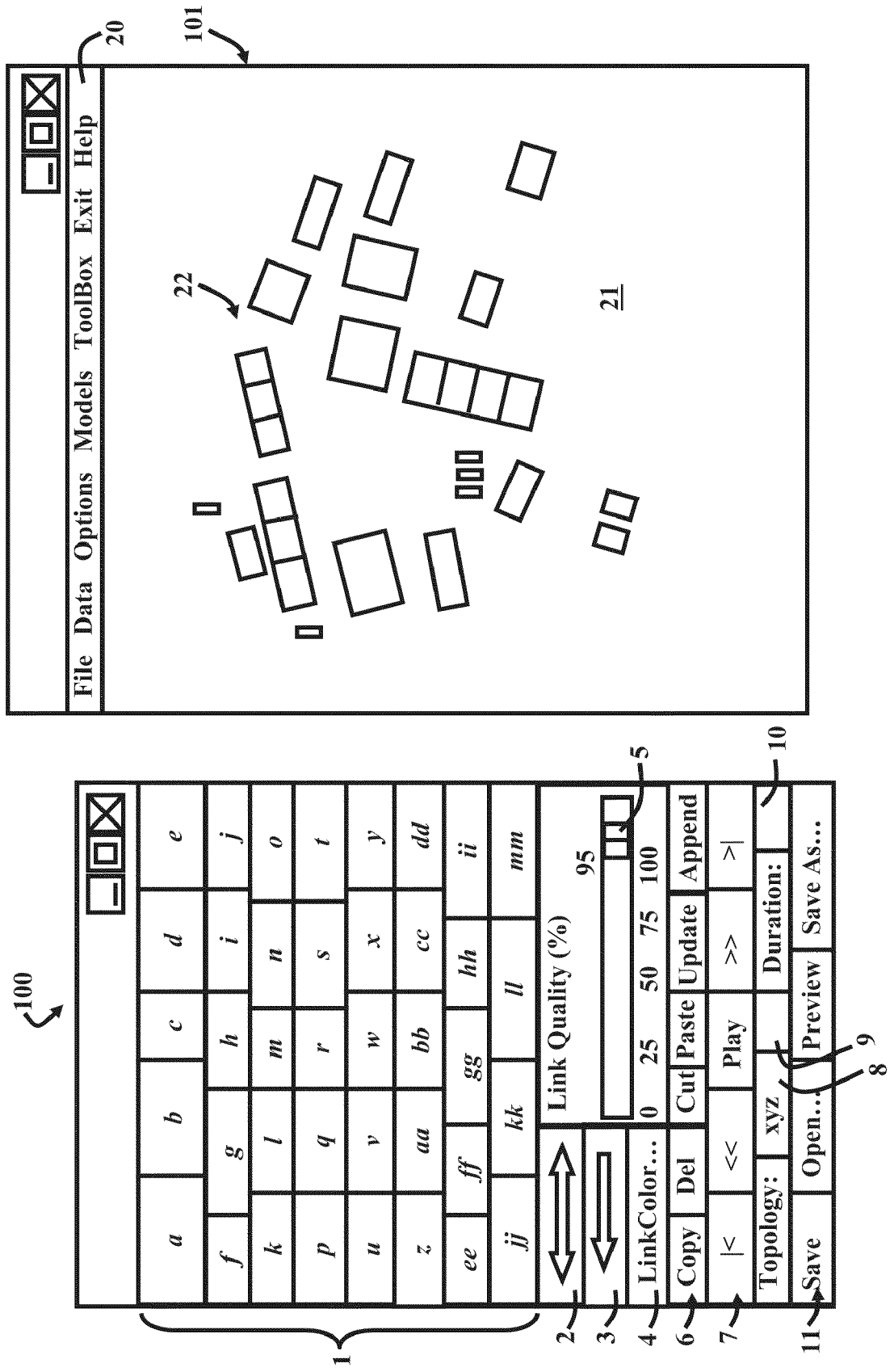
FIGS. 26 and 27 are schematic diagrams of screen displays according to the embodiments herein.

FIG. 26 illustrates a graphical user interface (GUI) 100 having various tools and features used for the creation of desired topologies on a computer screen 101. An iconographic image representing a node can be selected from a set of available images 1 (for example, the images may be "gif" icons representing objects, machines, terrain, vehicles, aircraft, nautical machines, persons, animals, etc., labeled as a-mm in FIG. 26) by pressing the button having the desired image. The selected image is applied to all subsequent creation of new nodes until it is deselected by pressing it again or by selecting another image or by selecting an image related to the creation of a link. The links are used for manually creating a link between any two nodes. The iconographic image 2 is used to draw a bidirectional, also known as symmetric, link between any two nodes. The iconographic image 3 is used to draw a unidirectional, also known as asymmetric, link between any two nodes. The currently selected color of a link is shown in 4. The slider 5 is used to set the quality of a link by moving the slide horizontally. The link-error rate (LER) is derived by subtracting the link quality from one hundred (i.e., LER=100−link quality). The selected options are applied to all subsequently drawn links until their values are changed.

A set of editing buttons 6: Copy, Delete, Cut, Paste, Update, and Append, is used to edit the internal data structure storing the list of the topologies being designed. The Copy button copies and saves the descriptions of the currently displayed topology. The Delete button removes the currently displayed topology from the list. The Cut button copies the descriptions of the currently displayed topology then remove it from the list. The Paste button displays the saved copy of a topology, creates a new topology, and inserts it into the list at the current ordinal position. The Update button updates the internal data storage to reflect any changes in the currently displayed topology. The Append button creates a new topology at the end of the list by appending the descriptions of the currently displayed topology.

A set of navigating buttons 7, |<, <<, Play/Stop, >>, and >|, is used for the visualization of each topology being stored in the internal list. Pressing the |< button displays the first topology. Pressing the << button displays the preceding topologies or the first one it has no precedence. Pressing the >> button displays the succeeding topologies or the last one if it has no successor. Pressing the >| button displays the last topology. Pressing the Play button changes its label to Stop and animates the sequences of dynamic topologies. Pressing the Stop button ends the current animation and changes the label to Play.

The row containing items 8-10 has three different functions. The name of a scenario file and the directory containing mobility-pattern files is given in box 8. The ordinal number of a topology in the internal list is displayed or entered in box 9. A numerical value indicating the time-duration of the currently displayed topology can be entered into box 10 as the number of seconds. The time-duration indicates the time interval between the currently displayed topology and the next one. The time duration is used for animating purposes and for emulating the rate at which a topology of a MANET changes.

A set of buttons 11, Save, Open . . . , Preview, and Save As . . . , relates to a scenario file. Pressing the Save button creates a scenario file and mobility-pattern files in a predetermined directory called sdf. Pressing the Save As . . . button opens up an ephemeral dialog window in which the file name of a new scenario file is typed. The scenario is then saved to the new scenario file. Each time a scenario is save to a file, the time-stamped positions of each node are extracted from the scenario and saved to a file whose name is the name of the participating node. Pressing the Open . . . button displays an ephemeral dialog window showing a list of existing scenario files, from which one can be selected. The contents of the selected file are then loaded into the internal list of topologies, replacing the old data if they exist. Pressing the Preview button sequentially loads every available scenario file being stored in the sdf directory and then animates the loaded scenario as fast as the host computer can perform by ignoring the time-duration of each topology.

Figure 27:
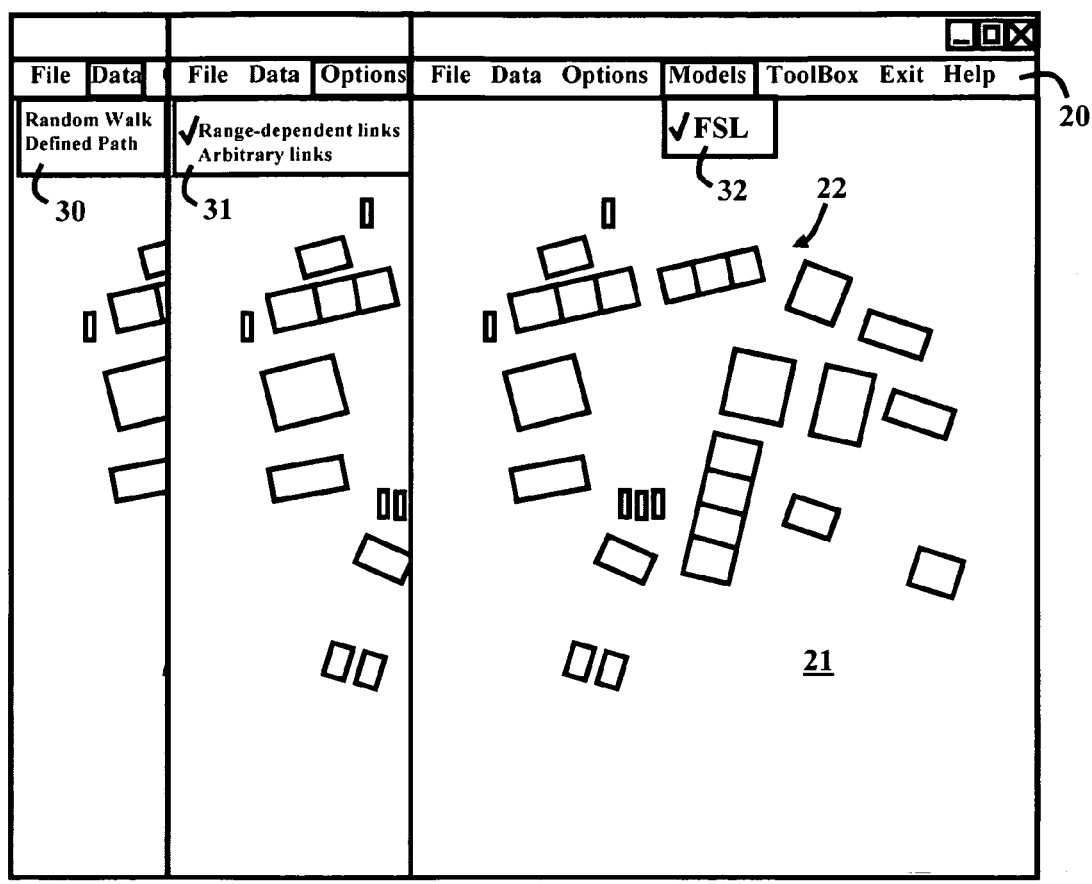

A row of menus 20 from which a functional feature can be selected is laid out horizontally. A drawing area 21, shown with an optional background image, is used to display the topologies 22. Some of the functional features in menus 20 are shown in FIG. 27 and described below. FIG. 27 shows the menu items of three pull-down menus 30-32 from which a functional feature is selected. The Data menu 30 shows two different ways to generate a mobility scenario: either by automatically applying the random-walk model or by manually defining a path for each mobile node to travel. The generated scenario data can be subsequently edited and manipulated to produce a desired result. Additional implementation of mobility models may be implemented and listed in this menu in the future.

The Options menu 31 has two options for establishing a link between any two nodes: (a) automatically creating a link between any two nodes by applying the radio-propagation model selected in menus 32, or (b) manually creating an arbitrary link between any two nodes regardless of their distance by dragging the cursor. The Models menu 32 shows a list of radio-propagation models to be used for the automatic establishment of a link between any two nodes. The free space loss (FSL) radio propagation model is now being used in the example shown in FIG. 27.

Figure 28:
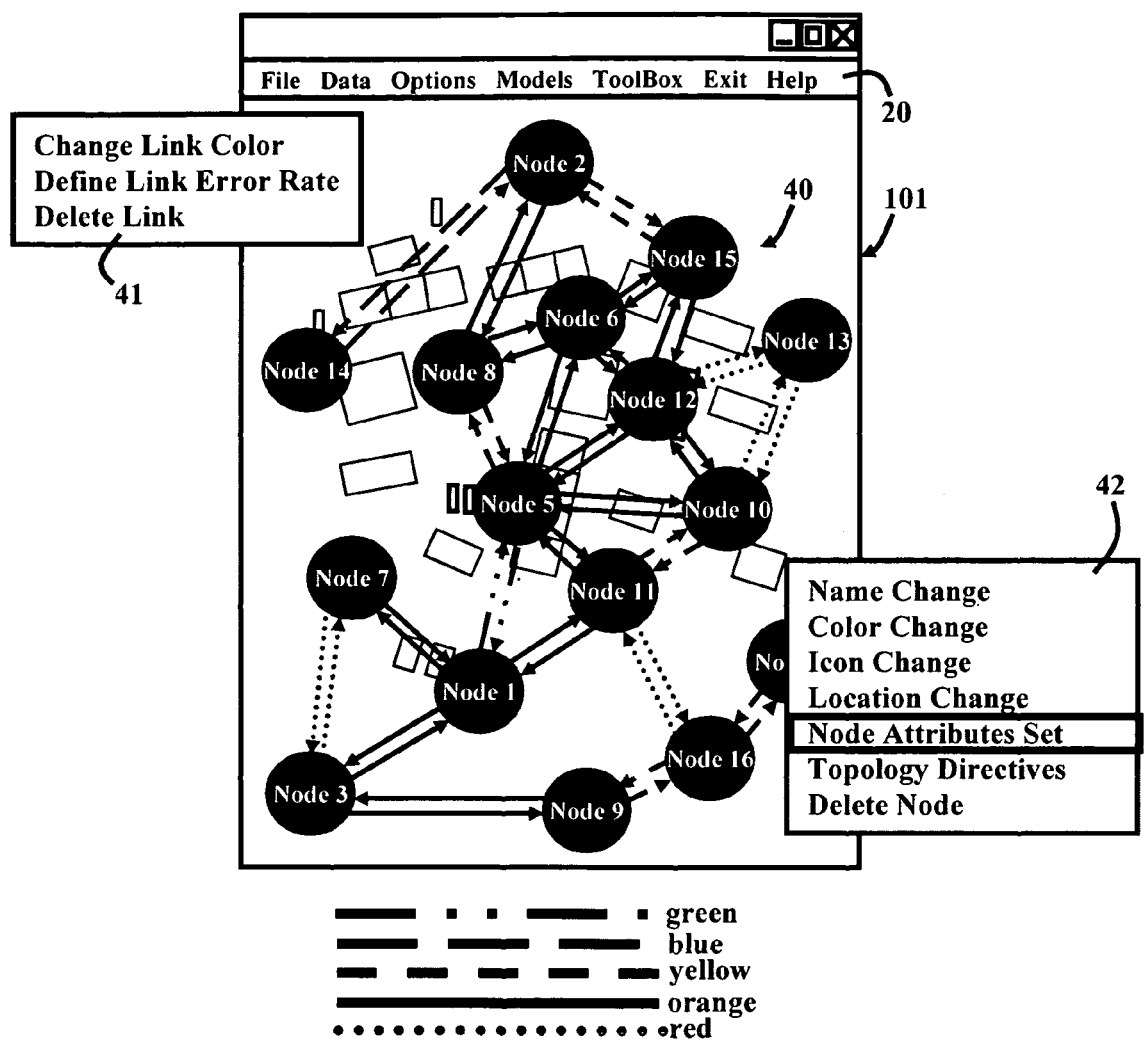
FIG. 28 is a schematic diagram of a screen display illustrating a network topology being depicted according to the embodiments herein.

FIG. 28 shows the graphical representation of a network topology 40 of a MANET, actions 41 that can be performed on a link, and actions 42 that can be performed on a node. Each node is represented by an iconographic image, under which is the name of the node. For example, each link may be symbolized by an arrow having one of the four colors: green, blue, yellow, orange, and red representing the link-error rates. The link-error rates and their colors are automatically computed and assigned if the Range-Dependent Links option in menu 31 is selected or manually assigned if the Arbitrary Links option is selected. The link-error rate values can be subsequently re-assigned by the user to create a desired scenario.

Clicking the right button of a pointing device (not shown) while the screen cursor is positioned at the location of a targeted link (right-clicking a link) displays a menu of actions 41 from which one can be selected and performed on the target link. Changing the color or defining the error rate of a link does not change the shape and size of the current topology; deleting a link does. Similarly, right-clicking a node displays an ephemeral window 42 showing a menu of actions from which one can be selected and performed on the targeted node. Changing the visual information of an existing node such as its iconographic image or the color of its name does not affect the properties of the current topology; deleting or relocating the visual information does affect the properties of the current topology.

Figure 30:
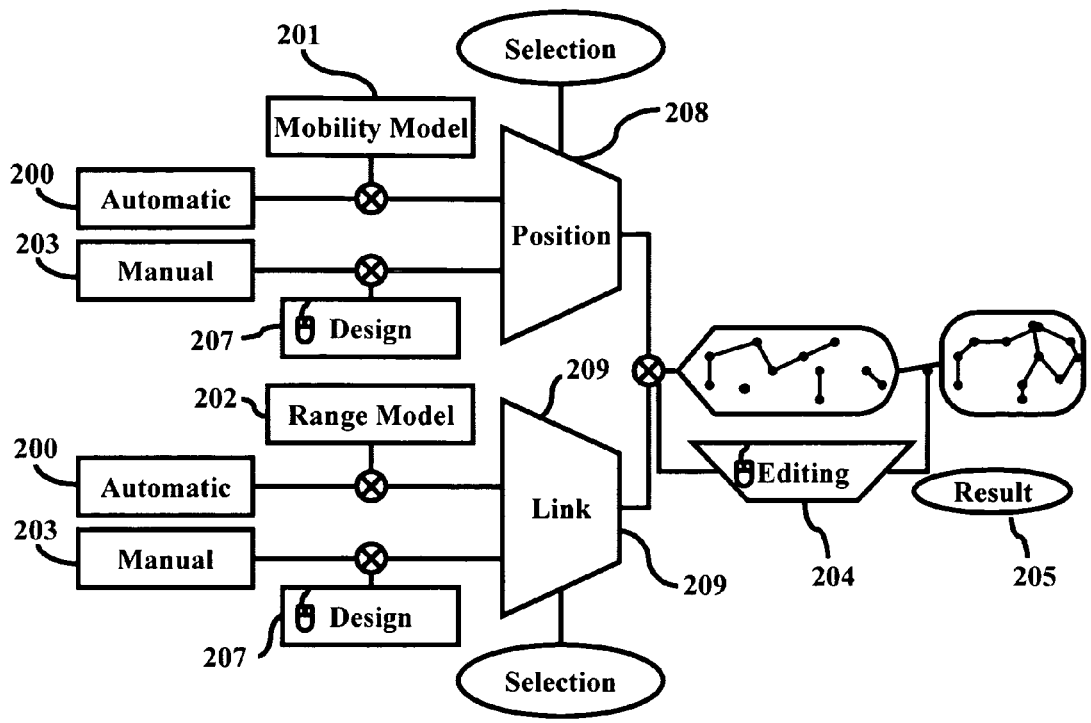
FIG. 30 is a graphical expression illustrating various ways to design a topology according to the embodiments herein.

FIG. 29 shows the attributes of a mobile node when the Node Attributes Set option is selected (menu 42 of FIG. 28). Changing an attribute value of its radio such as the transmission power or the reception sensitivity may change the number of links between it and its neighbors, effectively affecting the current topology. FIG. 30 shows the design process according to the embodiments herein with various options that are available to create and to edit a topology to produce a desired result. A dynamic topology can be created automatically 200 by applying a built-in mobility model 201 and a built-in range model 202. Once the dynamic topology has been generated, it can be edited 204 by clicking and dragging the participating nodes to the desired locations to produce a desired result 205. If a manual option 203 is selected, whether to create a node at a particular location 208 or to draw a link 209 between any pair of two existing nodes, then with the use of a pointing device 207, a dynamic topology can be created by clicking and dragging the cursor of the pointing device 207. Regardless of the method for creating a dynamic topology, the generated topology can be refined by manually editing 204 until a desired result 205 is achieved.

FIG. 30 shows the available design options and how they can be selected and combined to create a dynamic scenario comprising of sequences of distinct topologies. A dynamic scenario can be visually created manually, automatically, or semi-automatically. Regardless of the chosen method, the newly created scenario can be subsequently modified to create a desired result. The manual creation 203 of a topology gives the user complete control of each step conveniently using the built-in GUI 100 (of FIG. 26). The process for doing so is as follows: (1) specifying and creating the number of participating nodes, (2) creating a link between any pair of nodes, and (3) determining the duration of the topology. Creating a node is a two-step process: (1) selecting an icon to represent a mobile node, and (2) placing the icon on the screen 101 (of FIG. 26) at the desired location (for example, by pressing the left mouse button).

Manually creating a link between any two nodes is also a two-step process: (1) selecting an image representing a unidirectional or bidirectional link, and (2) dragging the cursor from the sink node to the source node to create an arrow. This feature is applicable to the generation of topology directives for the TEAlab testbed; therefore, the focus of the performing action is on the sink node because it is the host that will execute the directive "on <sink> accept <source>" during emulation.

In the automatic mode 200, a dynamic scenario can be quickly created and displayed on the screen 101 by applying a mobility model 201 and a range model 202. The selected mobility model 201, 202 generates the positions of the participating nodes over a user-specified time period. The selected range model 201, 202 calculates and determines the interconnections among the nodes. Once the scenario has been generated, it can be manually 203 or automatically 200 animated for visual editing, inspection, and verification.

Figure 31:
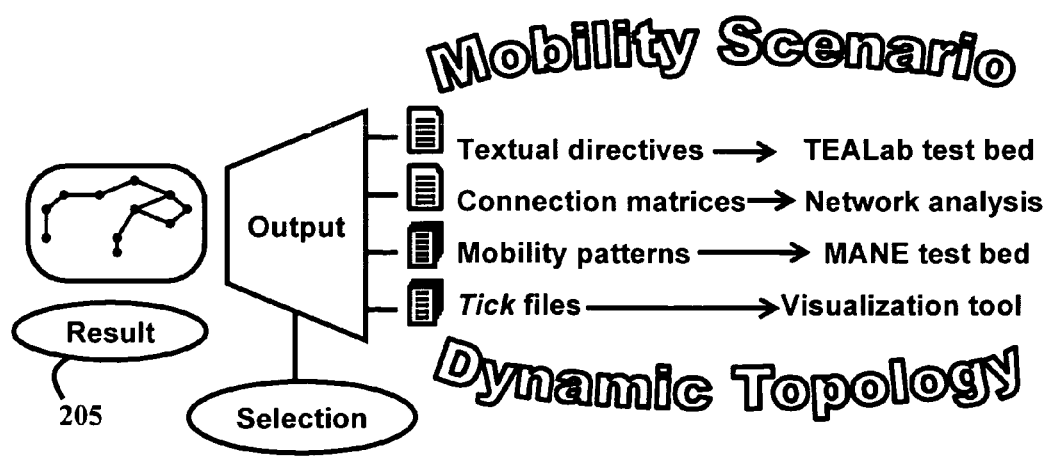
FIG. 31 is a graphical expression illustrating the transformation of a graphical representation of a dynamic topology into various formats of textual descriptions according to the embodiments herein.
Figure 32:
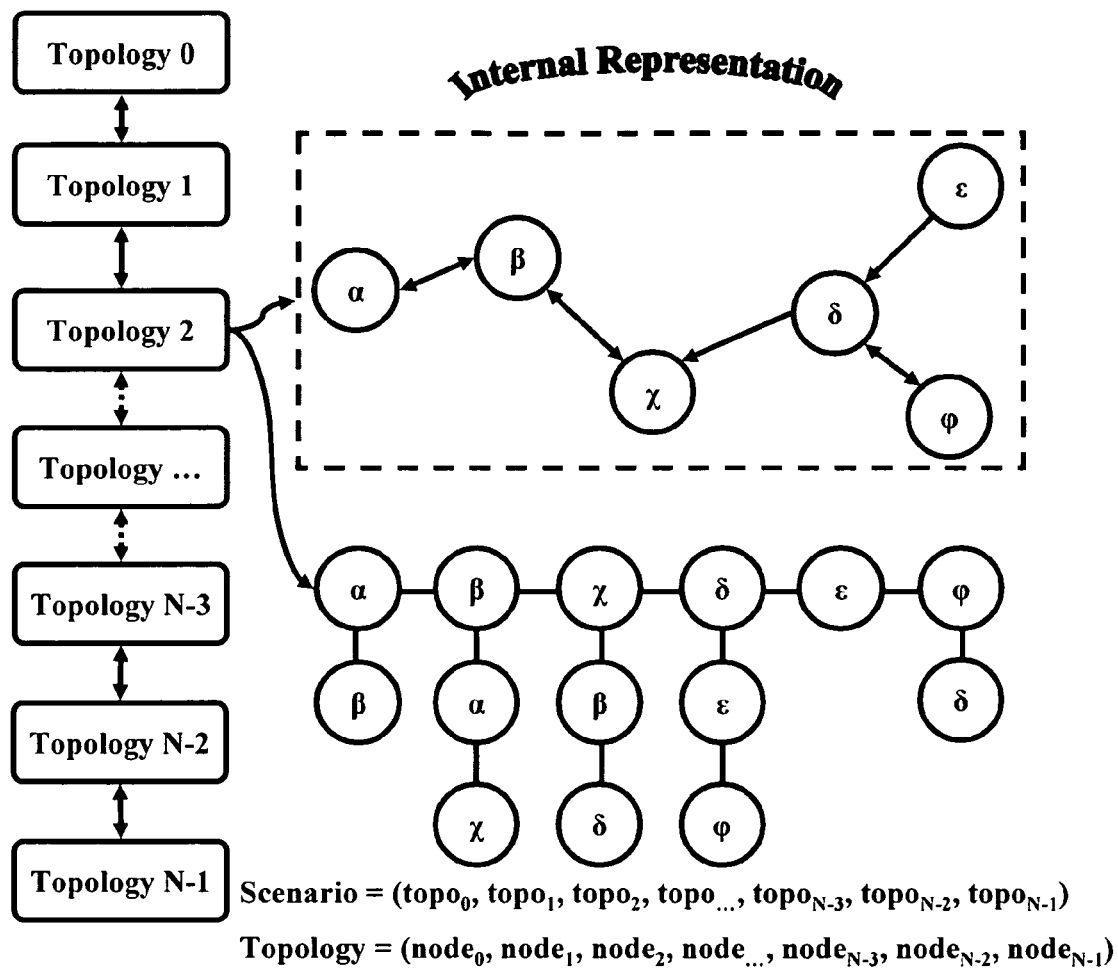
FIG. 32 is a graphical expression illustrating the internal implementation of a dynamic topology according to the embodiments herein.

FIG. 31 shows various options for the automatic transformation of the graphical representation of a dynamic topology into different textual specifications of the same scenario. FIG. 32 reveals the internal implementation of a dynamic scenario as an ordered list of topologies. Each topology is also implemented as a list of participating nodes. Each node tracks a list of neighboring nodes from which it can communicate.

The general process of designing a dynamic scenario using the embodiments herein comprises creating a series of discrete topologies meeting a specific need for a certain time. Each topology is a spatial-temporal snapshot of a dynamic MANET taken at a particular time. According to FIG. 32, the concept of a scenario is implemented in the embodiments herein as a mutable ordered list of topologies: Scenario= (topo$_0$, topo$_1$, . . . , topo$_{m-2}$, topo$_{m-1}$). A set of m! different scenarios can be created by permuting an existing m-topology scenario using the cut-and-paste operation according to the embodiments herein. Thus, a new scenario can be formed by simply re-arranging the order of the topologies in the list, saving the designer time and effort. The concept of a topology is implemented in the embodiments herein according to FIG. 32 as a dynamic set of n participating nodes being placed at specific locations on the screen for a specific time: Topology= (node$_0$, node$_1$ . . . , node$_{n-2}$, node$_{n-1}$). The number of participating nodes (n) can fluctuate among the topologies, and the order of the nodes in the set is inconsequential. Each node maintains and tracks a dynamic list of neighboring nodes from which it can receive signals.

Textual descriptions of a topology have three categories of directives specifying (1) the positions of each node, (2) the links between each pair of nodes, and (3) duration. Notation-wise, the descriptions of a topology comprises of sequences of zero or more position and link directives and a required duration directive:

{position directives}
{link directives}

The duration directive specifies the length of time during which the topology remains stationary; it is considered the rate at which a topology changes. The shorter the duration is specified, the faster the dynamic topology changes. The shortest duration is one second, which is the default.

Two mobility models and two radio-signal propagation models are built into the system provided by the embodiments herein. The two existing mobility models include the random-walk model and the user-defined path model. The random-walk model enables each participating node to travel independently at random velocity. The GUI 100 allows a user to enter the parameter values necessary for generating a dynamic scenario. The parameters include the size of the network, the maximum and the minimum traveling speed and direction, and the duration of the scenario. The user-defined path model enables the user to define a particular path for each node. Once a path has been defined, it is used to generate the position locations of the traveling node. From each newly created position location the tool computes the distances to other nodes and determines whether data-communication links between the traveling node and other nodes can exist. This model provides a semi-automatic way for creating a dynamic scenario. The two radio-signal propagation models comprise of a fixed-range model and a free-space-loss (FSL) model. Both range models implement a maximum distance beyond which no links will exist between any pair of nodes. Accordingly, the GUI 100 allows a user to enter appropriate parameter values for the chosen model. The fixed-range model uses a user-specified value indicating the maximum range; e.g., 200 meters. The FSL model uses the well-known Friss transmission equation and a set of radio-parameter values to compute the maximum transmission range. The values include antenna gains, transmission power, and reception sensitivity.

The design phase 207 (of FIG. 30) ends when each topology has been satisfactorily verified through visual inspection manually or automatically. The manual inspection of a topology is accomplished by pressing one of the action buttons that enables the display of a topology being stored internally in an ordered list. The automatic inspection is performed through graphical animation, dynamically displaying consecutive topologies in forward or reverse order. The overall design process may be incremental and iterative.

The final step is the generation of scenario files targeted for either or both emulation environments. If the target is the TEAlab environment, then the embodiments herein automatically transforms all the internal data representing a scenario into topology directives and saves them in a single file. Alternatively, if the target is the MANE environment, then the embodiments herein extract only the time-dependent position data (mobility patterns) of each node in the scenario and save them in separate files. An n-node network requires n files.

Figure 33A:
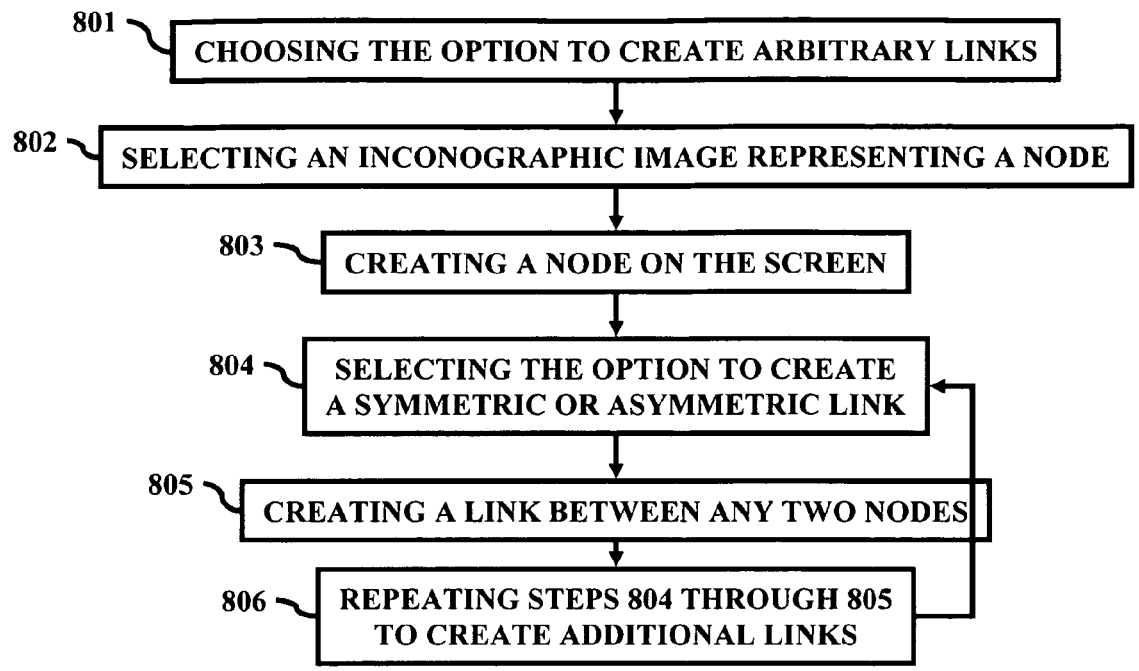
FIGS. 33(A) through 33(O) are flow diagrams illustrating methods according to the embodiments herein.
Figure 33B:
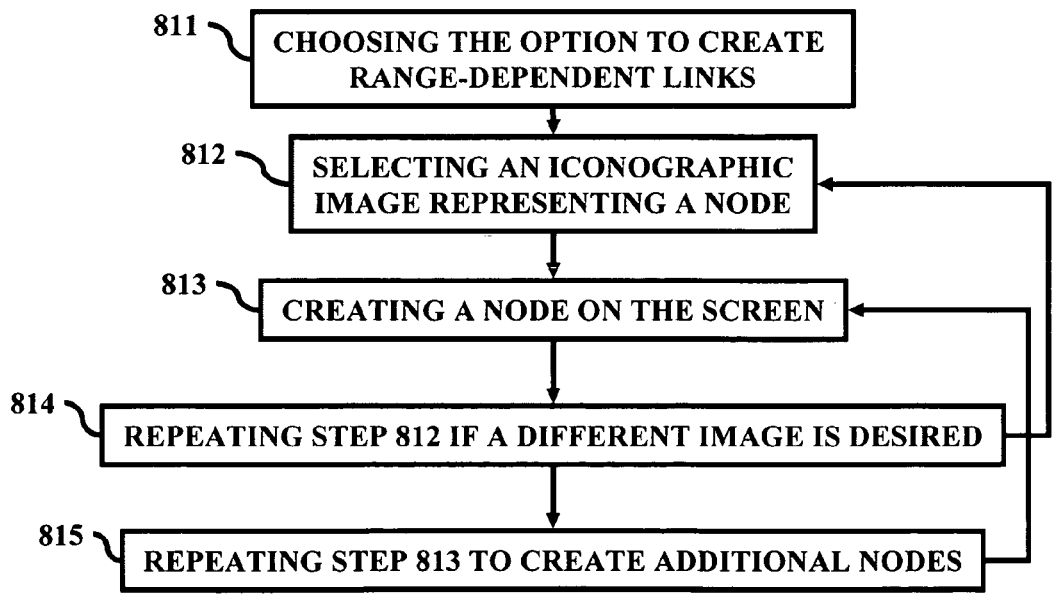
Figure 33E:
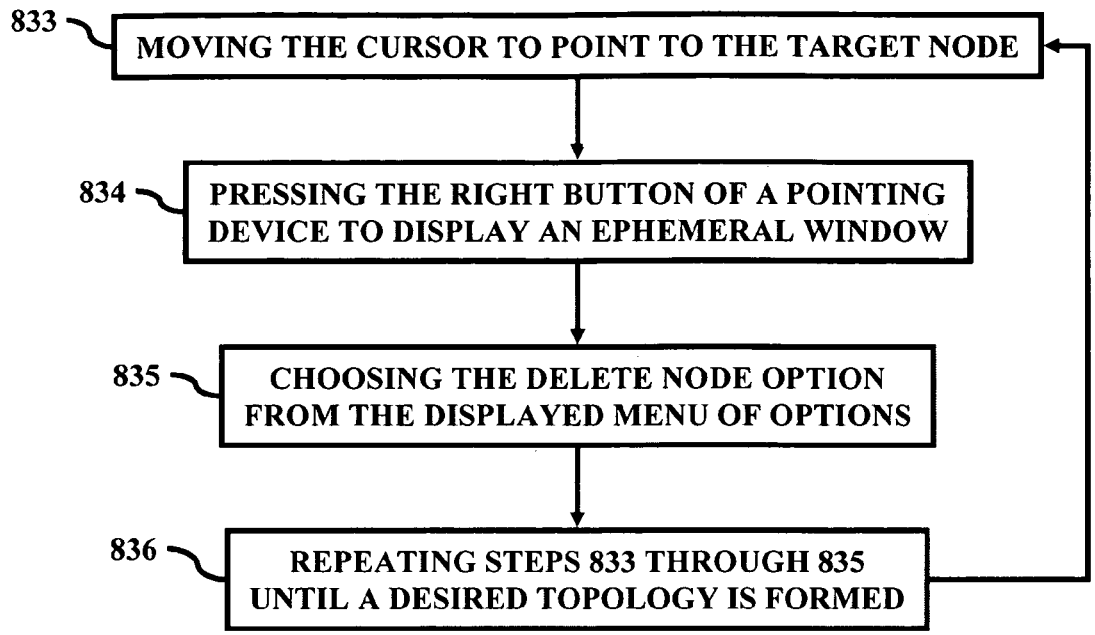
Figure 33F:
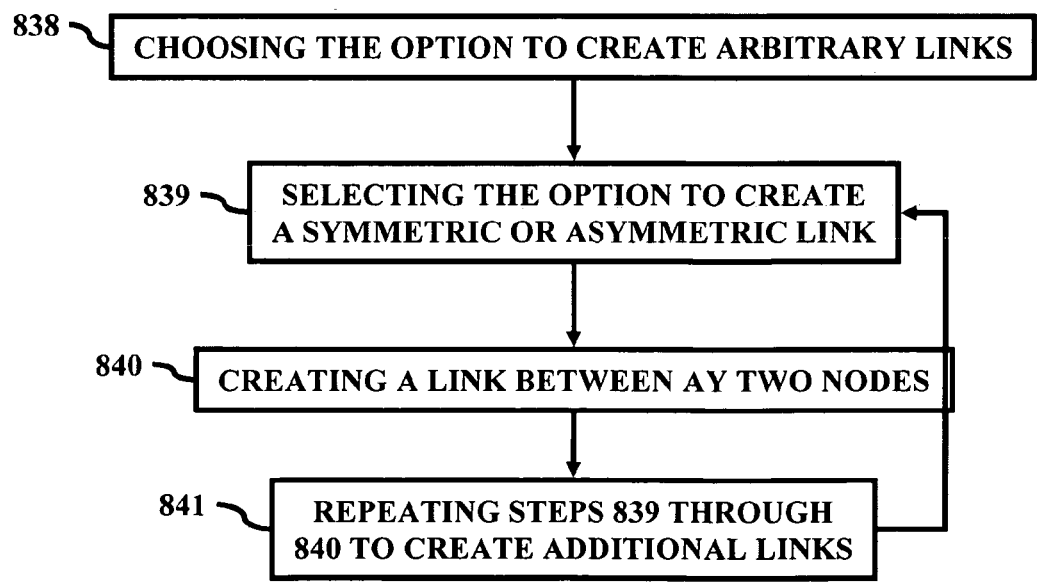
Figure 33G:
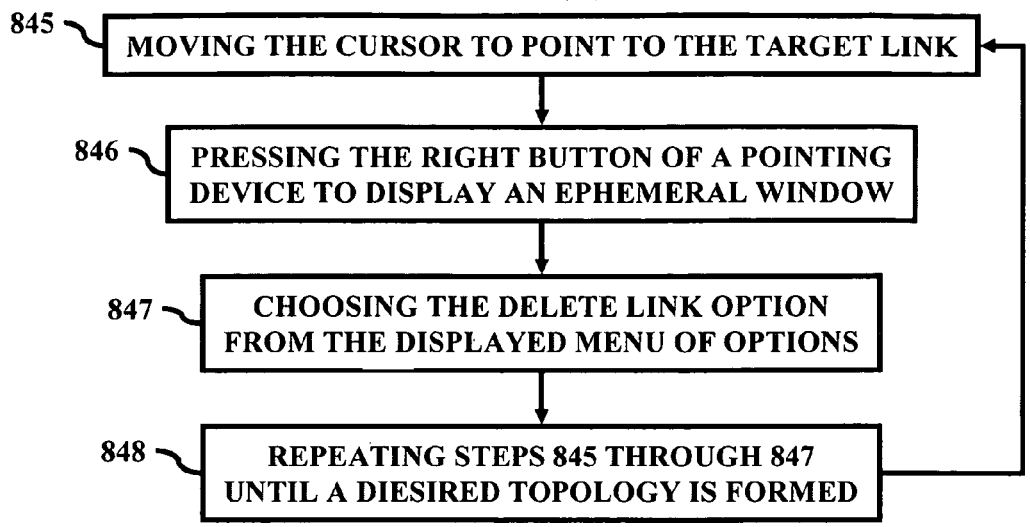
Figure 33H:
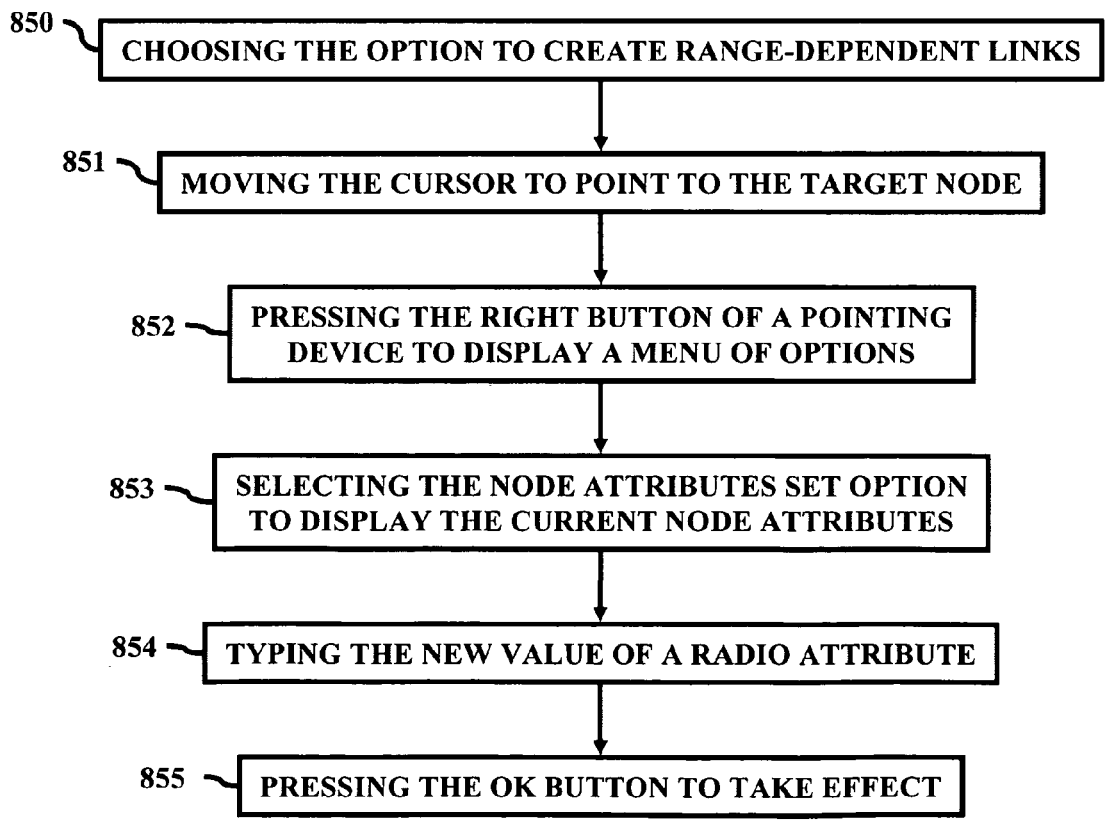
Figure 33L:
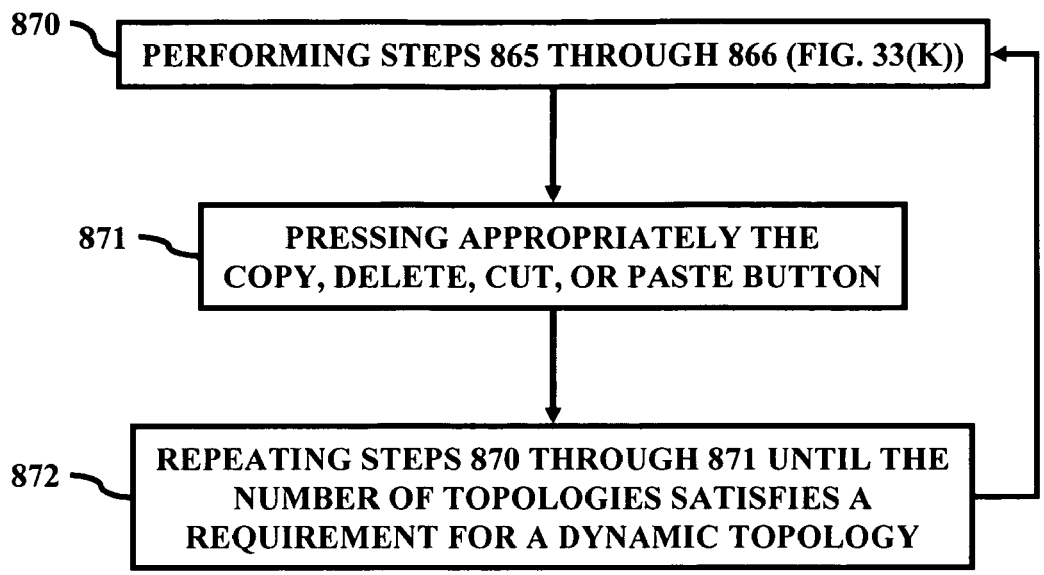
Figure 33M:
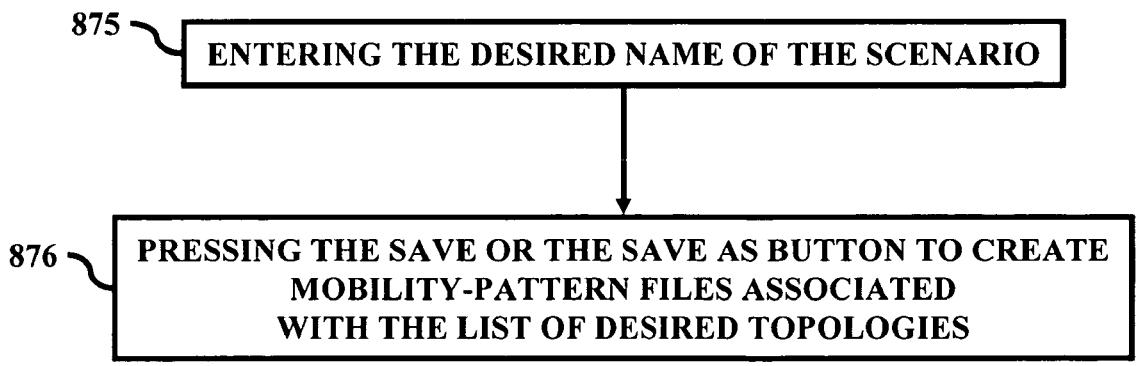
Figure 33N:
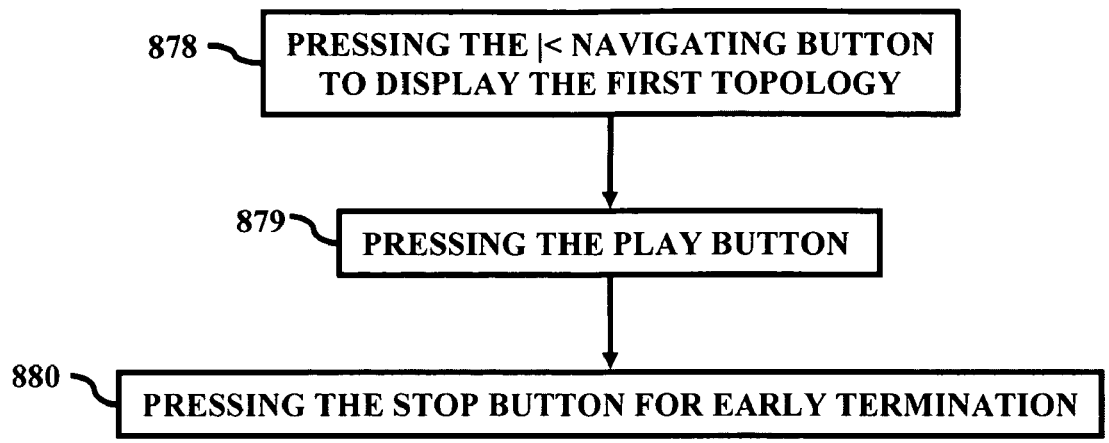
Figure 33O:
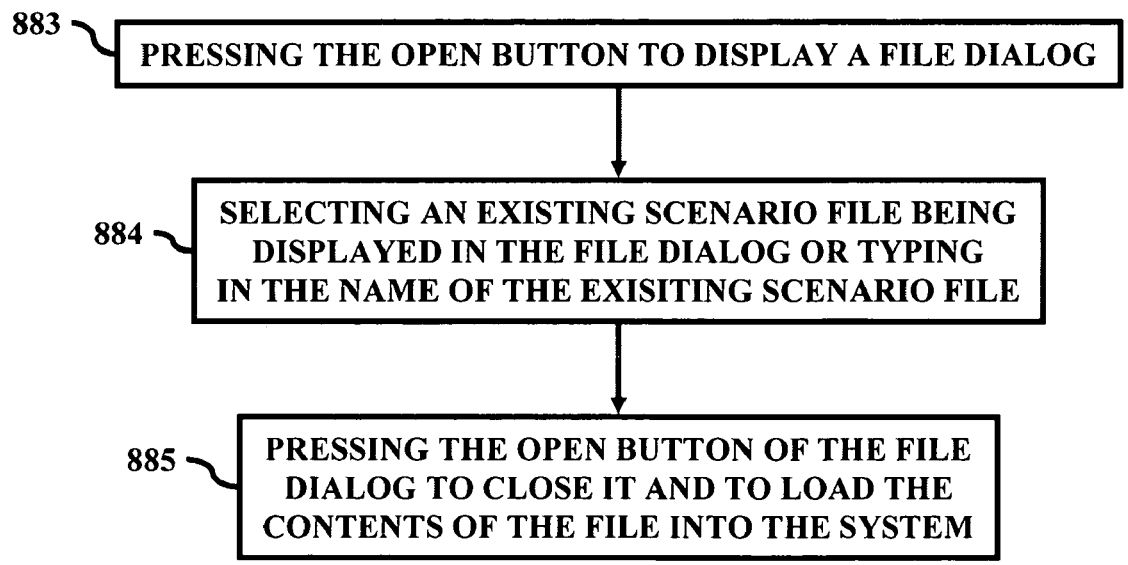

FIGS. 33(A) through 33(O), with reference to FIGS. 26 through 32, illustrate various flow diagrams depicting several methods according to the embodiments herein. More particularly, FIG. 33(A) illustrates a method for visually designing a desired topology of an ad-hoc network by manually placing the nodes and manually drawing the links, comprising the steps of choosing (801) the option to create arbitrary links; (802) selecting an iconographic image representing a node by pressing the desired image button using the left button of a pointing device 207 (e.g., a computer mouse); (803) creating a node on the screen 101 by moving the screen cursor to a desired location on the display area and pressing the left (for example) button of a pointing device 207; repeating the step (802) if a different image is desired; otherwise, repeating the step (803) to create additional nodes; selecting (804) the option to create a symmetric or asymmetric link by pressing the appropriate image showing the desired link type; creating (805) a link between any two nodes by moving the cursor to the target node, pressing the left button and dragging the cursor to the other target node, and then releasing the button; and (806) repeating the previous two steps (804-805) to create additional links, leading to the formation of a desired topology.

FIG. 33(B) illustrates a method for visually designing a desired topology of an ad-hoc network by manually placing the nodes and by letting the links automatically drawn, comprising the steps of (811) choosing the option to create range-dependent links; (812) selecting an iconographic image representing a node by pressing the desired image button using the left (for example) button of a pointing device 207 (e.g., a computer mouse); (813) creating a node on the screen 101 by moving the cursor to a desired location on the display area and pressing the left button of a pointing device 207; repeating (814) the step (812) if a different image is desired; otherwise, repeating (815) the step (813) to create additional nodes, leading to the formation of a desired topology.

FIG. 33(C) illustrates a method for visually manipulating the currently displayed topology by graphically repositioning the nodes, comprising the steps of choosing (821) the option to create range-dependent links or arbitrary links; relocating (822) the position of a node by dragging it to a new location, wherein if the range-dependent links option is selected, the link(s) between the relocated node and other node(s) is/are automatically recomputed to determine whether it/they should exist. If the arbitrary links option is selected, the link(s) between the relocated node and other nodes is/are intact. The next step is repeating (823) the previous steps (821-822) until a desired topology is formed.

FIG. 33(D) illustrates a method for visually manipulating the currently displayed topology by graphically adding a node, comprising the steps of choosing (825) the option to create range-dependent links or arbitrary links; selecting (826) an iconographic image representing a node by pressing the desired image button using the left (for example) button of a pointing device 207 (e.g., a computer mouse); creating (827) a new node on the screen 101 by moving the cursor to a desired location on the display area and pressing the left button of a pointing device 207, wherein if the range-dependent links option is selected, then the links between the newly created node and its neighbors are automatically established; performing (828) the step (825) if desired; performing (829) the step (826) if desired; and repeating (830) the step (827) to create additional nodes until a desired topology is formed.

FIG. 33(E) illustrates a method for visually manipulating the currently displayed topology by removing a node, comprising the steps of moving (833) the cursor to point to the target node; pressing (834) the right (for example) button of a pointing device 207 (e.g., a computer mouse) to display an ephemeral window 100 showing a menu of options; choosing (835) the delete node option from the displayed menu of options; and repeating (836) the previous steps (833-835) until a desired topology is formed.

FIG. 33(F) illustrates a method for visually manipulating the currently displayed topology by graphically adding a link, comprising the steps of choosing (838) the option to create arbitrary links; selecting (839) the option to create a symmetric or asymmetric link by pressing the appropriate image showing the desired link type; creating (840) a link between any two nodes by moving the cursor to the target node, pressing the left (for example) button and dragging the cursor to the other target node, and then releasing the button; and repeating (841) the previous steps (839-840) to create additional links, leading to the formation of a desired topology.

FIG. 33(G) illustrates a method for visually manipulating the currently displayed topology by graphically removing a link, comprising the steps of moving (845) the cursor to point to the target link; pressing (846) the right (for example) button of a pointing device 207 (e.g., a computer mouse) to display an ephemeral window 100 showing a menu of options; choosing (847) the delete link option from the displayed menu of options; and repeating (848) the previous steps (845-847) until a desired topology is formed.

FIG. 33(H) illustrates a method for visually manipulating the currently displayed topology by changing the value of a radio attribute, comprising the steps of choosing (850) the option to create range-dependent links; moving (851) the cursor to point to the target node; pressing (852) the right (for example) button of a pointing device 207 to display a menu of options; selecting (853) the node attributes set option to display the current node attributes; typing (854) in the new value of a radio attribute (e.g., power, gain); and pressing (855) the OK button to take effect.

FIG. 33(I) illustrates a method for specifying the time-duration of the currently displayed topology, comprising the steps of selecting (858) the input box labeled Duration by clicking it with the left (for example) button of a pointing device 207; and typing (859) in an integer representing the number of seconds, the input box labeled Duration. Furthermore, a method for saving the currently displayed topology by adding it to the end of the internal list comprises pressing the button 6 labeled Append. Moreover, a method for saving the currently displayed topology by updating its internal representation in the internal list comprises pressing the button 6 labeled Update.

FIG. 33(J) illustrates a method for visually traversing the internal list by pressing the navigating buttons, comprising the steps of pressing (860) the |< navigating button to display the first topology; or pressing (861) the >| navigating button to display the last topology; or pressing (862) the >> navigating button to display the succeeding topology; or pressing (863) the << navigating button to display the preceding topology.

FIG. 33(K) illustrates a method for displaying a topology being stored in the internal list, comprising the steps of typing (865) in the ordinal number of the target topology and pressing the Enter key; or searching (866) for the target topology visually.

FIG. 33(L) illustrates a method for visually editing the internal list of the desired topologies, comprising the steps of performing (870) the steps (865-866); pressing (871) appropriately the Copy, Delete, Cut, or Paste button 6 to change the length of the internal list; repeating (872) the previous steps (870-871) until the number of topologies satisfies a requirement for a dynamic topology.

FIG. 33(M) illustrates a method for creating mobility-pattern files by extracting the required data from the internal list of the desired topologies, comprising the steps of entering (875) the desired name of the scenario; and pressing (876) the Save or the Save As . . . button 11 to create mobility-pattern files associated with the list of desired topologies, automatically.

FIG. 33(N) illustrates a method for visually verifying or demonstrating the dynamic behavior of an ad-hoc network by automatically displaying the topologies being stored in the internal list, comprising the steps of pressing (878) the |< navigating button 7 to display the first topology if so desired; pressing (879) the Play button (the label is then changed to Stop); and pressing (880) the Stop button if early termination is desired.

FIG. 33(O) illustrates a method for loading an existing scenario file, comprising the steps of pressing (883) the Open . . . button to display a file dialog; selecting (884) an existing scenario file being displayed in the file dialog or typing in the name of the existing scenario file; and pressing (885) the Open button of the file dialog to close it and to load the contents of the file into the system 900 (of FIG. 34).

The embodiments herein comprise a topology-definition tool that provides a user an innovative and useful method for visually creating a desired scenario for emulating a MANET in laboratory environments. The embodiments herein can also be used for creating experimental topologies of other types of ad-hoc networks; e.g., a stationary sensor network or a mesh network. The mobility scenario files that the embodiments herein generate can also be used to feed other types of simulation and modeling tools for theoretical analysis. Moreover, the embodiments herein provide an auto-code generator that automatically and bidirectionally transforms the graphical representation of a topology into their corresponding textual topology directives, effectively eliminating the manual process of creating topology-definition files. The generator is a mobility-pattern generator that can automatically create position log files derived from the designed scenario.

The embodiments herein provide an effective tool for designing a specific topology to meet a specific research need. It is not only a visually appealing tool, but also a productivity-enhancing tool capable of shortening scenario development time and minimizing design effort. Furthermore, the embodiments herein provide an automated complexity-management tool that enables topology designers to better focus on designing a topology by freeing the designers from being concerned with the overwhelming details of creating and tracking a dynamic set of links among the participating nodes.

The embodiments herein may be implemented in several environments including: (1) Improved radio signal propagation models that take environmental conditions into consideration. This improvement provides a way for determining not only the existence of a data link, but also its attributes; e.g., error rates, transmission rates, etc. (2) Multiple radio-equipped mobile nodes. This feature provides a more realistic scenario for a military network, which often has various types of radios. The end results include a topology that has one set of node positions and multiple sets of communication links. (3) Communication scenarios. This addition generates data-communication directives for creating actual communication sessions during emulation. (4) Group mobility. This addition provides another option to automatically generate a dynamic scenario of a mobile tactical force. (5) Incorporation of digital terrain elevation data (DTED). The addition will provide a more realistic operational map for the area in which a MANET operates. The data can also be used to feed a radio-signal propagation model. (6) Vehicle movement. The routes of two or more vehicles can be represented according to the embodiments herein whereby as the vehicles move on the display screen 101 (representing travel along the routes), the lines representing the radio transmission/connectivity between the two vehicles (as well as the other nodes) dynamically change as the vehicles (or nodes) travel along the routes.

An extension of this capability could be to monitor two vehicles via GPS and display the radio connectivity on the screen 101.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments herein is depicted in FIG. 34. This schematic drawing illustrates a hardware configuration of an information handling/computer system 900 in accordance with the embodiments herein. The system 900 comprises at least one processor or central processing unit (CPU) 910. The CPUs 910 are interconnected via system bus 912 to various devices such as a random access memory (RAM) 914, read-only memory (ROM) 916, and an input/output (I/O) adapter 918. The I/O adapter 918 can connect to peripheral devices, such as disk units 911 and tape drives 913, or other program storage devices that are readable by the system. The system 900 can read the inventive instructions on the program storage devices and follow these instructions to execute the methodology of the embodiments herein. The system 900 further includes a user interface adapter 919 that connects a keyboard 915, mouse 917, speaker 924, microphone 922, and/or other user interface devices such as a touch screen device (not shown) to the bus 912 to gather user input. Additionally, a communication adapter 920 connects the bus 912 to a data processing network 925, and a display adapter 921 connects the bus 912 to a display device 923 which may be embodied as an output device such as a monitor, printer, or transmitter, for example.

The embodiments herein may be used in several implementations including: (1) visually designing a desired topology or a series of desired topologies of a wireless mobile ad hoc network (MANET) by placing the participating nodes at desired locations and by arbitrarily drawing a link between any two nodes or by applying a radio propagation model to automatically establish a link connecting any pair of two nodes; (2) automatically displaying and creating a random topology or a series of random topologies of a wireless network using mathematical models describing a mobility scenario and a radio propagation model; (3) automatically displaying and creating positions of communicating nodes and manually creating arbitrary links to form a topology; (4) automatically creating a mobility-pattern file consisting of sequential textual descriptions of a single static topology or a dynamic mobility scenario; (5) automatically creating a position file consisting of time-stamped positions (mobility pattern) of every participating node connected to a MANET; (6) automatically creating a connection-matrix (also known as adjacency matrix) file describing the contiguous structure of a graph that represents the dynamic topologies of a MANET. The matrices are the basis for subsequent computational analysis of the complex structure and behavior of a dynamic MANET; (7) visually editing and manipulating an existing a dynamic topology being designed or loaded from an existing file using a graphical user interface; (8) visually and automatically managing the complexity of designing and maintaining a mobility-scenario file; (9) visually conducting a dry run of a dynamic MANET before an actual emulation or simulation; (10) visually studying the behavior of a dynamic MANET; (11) visually demonstrating a dynamic MANET for educational, training, and marketing purposes; (12) designing desired topologies of other types of ad hoc networks whether the communicating nodes can move, whether they are connected to a fixed communications network infrastructure (e.g., the Internet), or whether they use wireless communications technologies. Some of these ad hoc networks include, but are not limited to, mesh networks, sensor networks, and other types of multi-hop networks such as cellular and peer-to-peer (P2P) networks; (13) computationally analyzing the complex structure and behavior of a dynamic MANET and visualizing the results; (14) monitoring and visualizing dynamic topologies of a physical MANET; (15) simulating and modeling a complex and interwoven MANET, including routing mechanisms, radio communications capability, power and energy conservation and usage, and other applicable attributes of a mobile wireless communicating entity; (16) simulating, modeling, and displaying cyber attack-and-defense scenarios in support of the development of robust, effective, and efficient defensive information-assurance technologies potentially capable of securing, protecting, and defending a MANET; and (17) extending the functional capacity and capability of the invention by providing to other MANET developers an application programming interface (API) to the computer code that implements the embodiments herein.

Generally, the embodiments herein provide a method for permuting an existing dynamic topology to create a new scenario (an n-topology scenario can be permuted to create n-factorial (n!) different scenarios). Moreover, the embodiments herein provide a method for graphically editing and manipulating an existing dynamic topology to change its characteristics or to create a new scenario, deriving from an existing one. In addition, the embodiments herein provide a method for automatically managing the complexity of a mobility scenario file consisting of contiguous textual directives unambiguously specifying the geometric positions of all the participating mobile nodes and their internodal communications links. Also, the embodiments herein provide a method for automatically generating executable and consistent textual directives specifying contiguous, changing topologies of a MANET. Additionally, the embodiments herein provide a method for visually creating a desired scenario and automatically creating a desired mobility-pattern scenario. Furthermore, the embodiments herein provide a method for visually previewing or rehearsing a dynamic topology before emulating or simulating a MANET. Moreover, the embodiments herein provide a method for visually inspecting, verifying a dynamic topology by graphical animation.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for creating topologies for a virtual mobile network comprising:

generating at least two nodes representing transmitters and/or receivers in the network; each of said at least two nodes having parameters including a location, a receiving range if the node is capable of receiving; and a transmission range if the node is capable of transmitting;

determining the distance between the nodes based upon the locations of each node;

generating a bidirectional link for connection between two nodes when the distance between the nodes is within the transmission and receiving ranges of both nodes;

generating a unidirectional link for connection between the nodes when the distance between the nodes is only within the transmission range of a first node and the receiving range of a second node but when there is no capability to communicate from the second node to the first;

storing the specifications of the topology of the network in memory;

generating at least a second topology by changing the transmitting ranges, receiving ranges, number of nodes and/or locations of the nodes within the network;

repeating the steps of generating bidirectional and unidirectional links for the at least one new topology;

storing the at least one new topology in memory;

whereby the stored topologies are adapted to be inputted into a system capable of emulating a mobile ad-hoc network.

2. The method of claim 1 wherein the step of generating at least two nodes comprises inputting an existing network topology comprising at least two nodes and at least one link.

3. The method of claim 2 further comprising changing an existing topology by changing the (a) locations of the nodes,
(b) transmission and or receiving capabilities of the nodes,
(c) speed and/or direction of travel of the nodes, and/or
(d) the number of nodes.

4. The method of claim 1, wherein images of the nodes and links are displayed on a display and the step of generating at least two nodes comprises arbitrarily selecting the number of nodes, the locations of the nodes and the links.

5. The method of claim 1, wherein images of the nodes and links are displayed on a display and the step of generating at least two nodes comprises creating a node on the display by moving a computer cursor to a desired location on the display and activating the program to create a node at the location of the cursor.

6. The method of claim 1 wherein images of the nodes and links are displayed on a display and the step of generating a bidirectional link comprises selecting a bidirectional link icon using a computer cursor and activating the program to create a bidirectional link on the display.

7. The method of claim 1 wherein images of the nodes and links are displayed on a display and the step of generating a unidirectional link comprises selecting a unidirectional link icon using a computer cursor and activating the program to create a unidirectional link on the display.

8. The method of claim 1 wherein images of the nodes and links are displayed on a display and the step of generating a bidirectional link comprises moving a computer cursor to a node and dragging the cursor to another node and then activating the computer program to create a bidirectional link between the two nodes.

9. A method for creating and configuring virtual topologies for a mobile network comprising:

generating at least two nodes representing transmitters and/or receivers in the network; each of said at least two nodes having parameters including a location, and whether or not the node is capable of receiving or transmitting;

generating a bidirectional link for connection between two nodes when both nodes are capable of receiving and transmitting;

generating a unidirectional link for connection between first and second nodes when there exists the capability for the first node to transmit and the second node to receive, but there is no capability to communicate from the second node to the first;

storing the topology of the network in memory;

generating at least a second topology by changing the number of nodes and/or locations of the nodes within the network;

repeating the steps of generating bidirectional and unidirectional links for the at least one new topology;

storing the at least one new topology in memory;

whereby the stored topologies are adapted to be inputted into a system capable of emulating a mobile ad-hoc network.

10. The method of claim 9, wherein images of the nodes and links are displayed on a display and the step of generating at least two nodes comprises arbitrarily selecting the number of nodes, the locations of the nodes and the links.

11. The method of claim 9, wherein images of the nodes and links are displayed on a display and the step of generating at least two nodes comprises creating a node on the display by moving a computer cursor to a desired location on the display and activating the program to create a node at the location of the cursor.

12. The method of claim 9, wherein images of the nodes and links are displayed on a display and the step of generating a bidirectional link comprises selecting a bidirectional link icon using a computer cursor and activating the program to create a bidirectional link on the display.

13. The method of claim 9, wherein images of the nodes and links are displayed on a display and the step of generating a unidirectional link comprises selecting a unidirectional link icon using a computer cursor and activating the program to create a unidirectional link on the display.

14. The method of claim 9, wherein images of the nodes and links are displayed on a display and the step of generating a bidirectional link comprises moving a computer cursor to a node and dragging the cursor to another node and then activating the computer program to create a bidirectional link between the two nodes.

15. The method of claim 9, wherein said nodes represent moving vehicles traveling along routes and the topology is dynamic as it changes to represent the moving vehicles.

16. A method for creating topologies for a virtual mobile network performed on a computer comprising a graphical display, the method comprising:

inputting location information into computer memory for at least two nodes representing transmitters and/or receivers in the network; each of said at least two nodes having parameters including a location, a receiving range if the node is capable of receiving;

and a transmission range if the node is capable of transmitting;

automatically, by computer, determining the distance between the nodes based upon the locations of each node;

automatically, by computer, generating a bidirectional link for connection between two nodes when the distance between the nodes is within the transmission and receiving ranges of both nodes;

automatically, by computer, generating a unidirectional link for connection between the nodes when the distance between the nodes is only within the transmission range of a first node and the receiving range of a second node but when there is no capability to communicate from the second node to the first;

storing the topology of the network in memory;

relocating a node using a cursor on the graphical display whereupon the computer automatically recalculates the distance between the relocated node and each neighboring node to determine:

whether or not the relocated node is within the maximum transmission range of a neighboring node and receiving range of the relocated node, and, if so, generate an arrow from the neighboring node towards the relocated node;

whether or not the neighboring node is within the maximum transmission range of the relocated node and the receiving range of the neighboring node, and if so, generate an arrow from the relocated node towards the neighboring node; and if the distance between the relocated node and neighboring node is within the transmission and receiving ranges of both nodes, a bidirectional arrow is generated.

* * * * *